United States Patent
Chen et al.

(10) Patent No.: US 12,442,956 B2
(45) Date of Patent: Oct. 14, 2025

(54) CONTACT LENS PRODUCT

(71) Applicant: LARGAN MEDICAL CO., LTD., Taichung (TW)

(72) Inventors: Wei-Yuan Chen, Taichung (TW); Po-Tsun Chen, Taichung (TW); Wei-Chun Chen, Taichung (TW); Chun-Hung Teng, Taichung (TW)

(73) Assignee: LARGAN MEDICAL CO., LTD., Taichung (TW)

( * ) Notice: Subject to any disclaimer, the term of this patent is extended or adjusted under 35 U.S.C. 154(b) by 861 days.

(21) Appl. No.: 17/704,129

(22) Filed: Mar. 25, 2022

(65) Prior Publication Data

US 2022/0326411 A1 Oct. 13, 2022

(30) Foreign Application Priority Data

Apr. 1, 2021 (TW) ................. 110112232

(51) Int. Cl.
| | | |
|---|---|---|
| *A61L 12/00* | (2006.01) | |
| *A61L 12/08* | (2006.01) | |
| *A61L 12/14* | (2006.01) | |
| *C08F 20/30* | (2006.01) | |
| *C08F 22/10* | (2006.01) | |
| *G02B 1/04* | (2006.01) | |

(52) U.S. Cl.
CPC ............ *G02B 1/043* (2013.01); *A61L 12/147* (2013.01); *C08F 20/30* (2013.01); *C08F 22/1006* (2020.02)

(58) Field of Classification Search
CPC .......... G02B 1/043; A61L 12/00; A61L 12/08
See application file for complete search history.

(56) References Cited

U.S. PATENT DOCUMENTS

| | | | |
|---|---|---|---|
| 2007/0204412 A1 | 9/2007 | Arkles | |
| 2010/0240905 A1* | 9/2010 | Raja ............... | C07C 49/255 |
| | | | 560/194 |
| 2013/0107201 A1 | 5/2013 | Argal et al. | |
| 2015/0359625 A1 | 12/2015 | Argal et al. | |
| 2020/0054555 A1 | 2/2020 | Rout et al. | |
| 2020/0156336 A1 | 5/2020 | Chauhan et al. | |
| 2020/0308481 A1 | 10/2020 | Chen et al. | |

FOREIGN PATENT DOCUMENTS

| | | | | |
|---|---|---|---|---|
| CN | 110551026 A | * | 12/2019 | ............. C07C 67/29 |
| KR | 20200037002 A | * | 4/2020 | ............. C08F 220/10 |
| TW | 201825086 A | | 7/2018 | |
| TW | 202000712 A | | 1/2020 | |
| TW | 202003602 A | | 1/2020 | |
| TW | 202003708 A | | 1/2020 | |
| TW | M598423 U | | 7/2020 | |

OTHER PUBLICATIONS

Machine translation of CN-110551026-A (no date).*
Machine translation of KR-20200037002-A (no date).*

* cited by examiner

*Primary Examiner* — Michael J Feely
(74) *Attorney, Agent, or Firm* — McClure, Qualey & Rodack, LLP

(57) ABSTRACT

A contact lens product includes a contact lens and a buffer solution. The contact lens is stored in the buffer solution. The buffer solution includes at least one antioxidant. The contact lens includes at least one curcuminoid. When a weight percentage concentration of the curcuminoid in the contact lens is Ccu, and a weight percentage concentration of the antioxidant in the buffer solution is Cao, a specific condition relating to Ccu/Cao is satisfied.

18 Claims, 11 Drawing Sheets

CONTACT LENS PRODUCT

RELATED APPLICATIONS

This application claims priority to Taiwan Application Serial Number 110112232, filed Apr. 1, 2021, which is herein incorporated by reference.

BACKGROUND

Technical Field

The present disclosure relates to a contact lens product. More particularly, the present disclosure relates to a contact lens product which can reduce stray light and eliminate glare.

Description of Related Art

To protect and prevent eyes from the damage caused by light with high energy, the conventional contact lens usually includes ultraviolet/blue light absorbers synthesized chemically in the traditional arts so as to achieve blocking effects. However, the conventional light absorbers may cause uncomfortable sensations to the eyes easily when contacted therewith, and severe immune response or toxic damages to the eyes may be induced by the excessive dose of the light absorbers. Furthermore, the general curcumin ((1E,6E)-1,7-Bis(4-hydroxy-3-methoxyphenyl)-1,6-heptadiene-3,5-dione) is without a good binding effect with the monomer of the contact lens. Thus, the general curcumin may release from the contact lens easily and may even be degraded due to the failure to overcome the high temperature and high pressure of the sterilization process.

SUMMARY

According to one aspect of the present disclosure, a contact lens product includes a contact lens and a buffer solution. The contact lens is stored in the buffer solution, and the buffer solution includes at least one antioxidant. The contact lens includes a cured monomer mixture including at least one curcuminoid. The at least one curcuminoid is synthesized by reacting unmodified curcumin with a modifying reactant selected from the group consisting of 2-hydroxyethyl methacrylate (HEMA), methacrylic acid (MAA), and glycerol monomethacrylate (GMA), where the reaction involves the hydroxyl group of HEMA, the carboxylic acid group of MMA, or a hydroxyl group of GMA. The at least one curcuminoid is represented by Formula (I) or Formula (II):

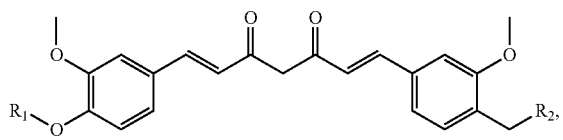

Formula (I)

wherein $R_1$ and $R_2$ represent a hydrogen atom or a reacted modifying reactant, and at least one of $R_1$ and $R_2$ represents the reacted modifying reactant; or

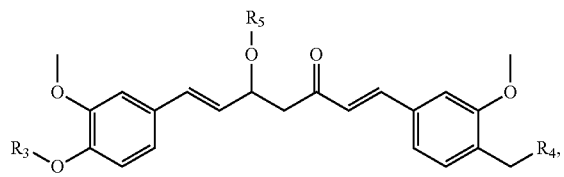

Formula (II)

wherein $R_5$ represents a reacted modifying reactant, and $R_3$ and $R_4$ represent a hydrogen atom or a reacted modifying reactant. When a weight percentage concentration of the curcuminoid in the contact lens is Ccu, and a weight percentage concentration of the antioxidant in the buffer solution is Cao, the following conditions is satisfied:

$$0.01 \leq Ccu/Cao \leq 10.00.$$

BRIEF DESCRIPTION OF THE DRAWINGS

The present disclosure can be more fully understood by reading the following detailed description of the embodiment, with reference made to the accompanying drawings as follows.

DETAILED DESCRIPTION

Figure 1:
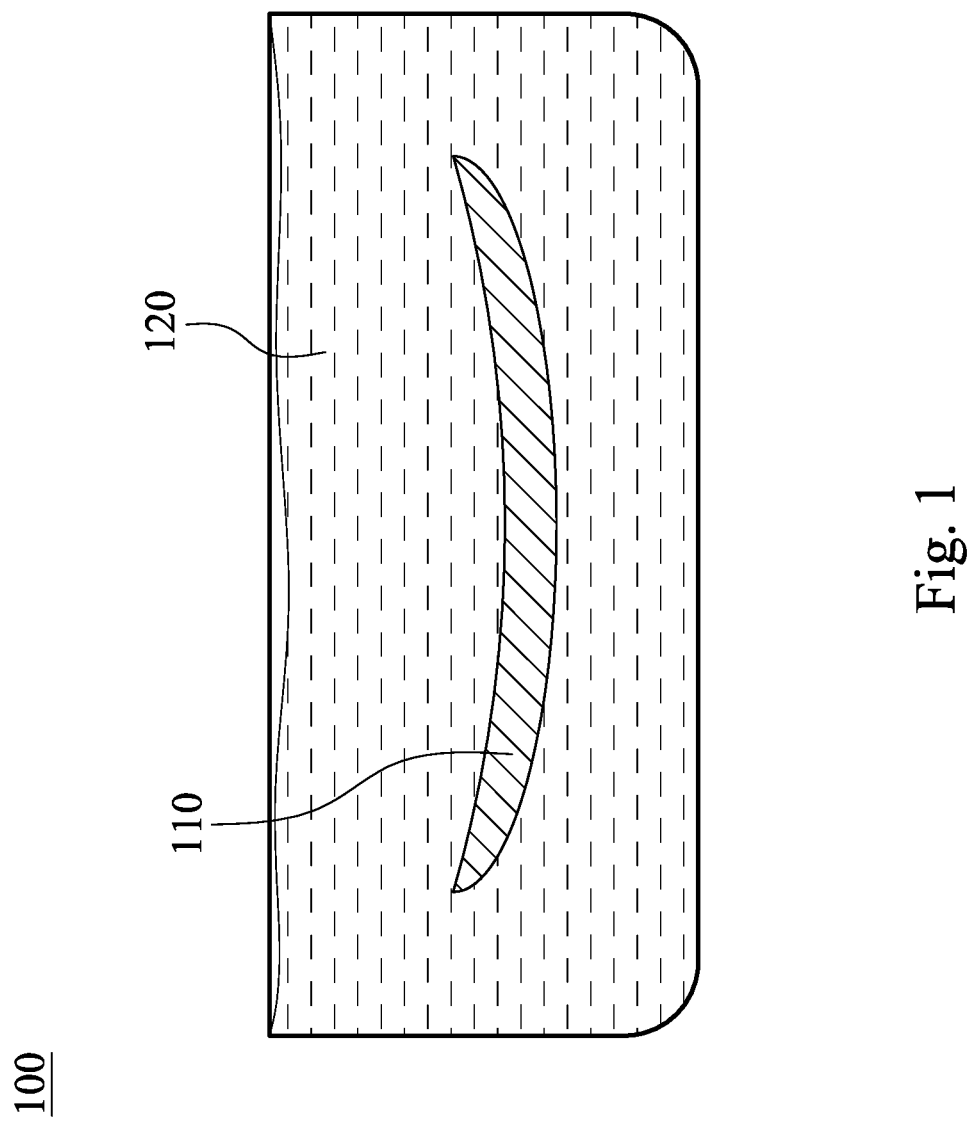
FIG. 1 is a schematic view of a contact lens product according to one embodiment of the present disclosure.

FIG. 1 is a schematic view of a contact lens product 100 according to one embodiment of the present disclosure. The contact lens product 100 includes a contact lens 110 and a buffer solution 120. The contact lens 110 is stored in the buffer solution 120, and the buffer solution 120 includes at least one antioxidant.

The contact lens 110 includes a cured monomer mixture including at least one curcuminoid. The at least one curcuminoid is synthesized by reacting unmodified curcumin with a modifying reactant selected from the group consisting of 2-hydroxyethyl methacrylate (HEMA), methacrylic acid (MAA), and glycerol monomethacrylate (GMA), where the reaction involves the hydroxyl group of HEMA, the carboxylic acid group of MAA, or a hydroxyl group of GMA. The at least one curcuminoid is represented by Formula (I) or Formula (II):

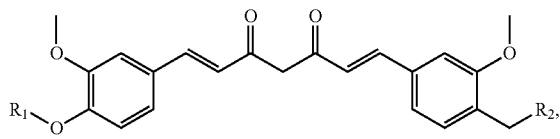

Formula (I)

wherein $R_1$ and $R_2$ represent a hydrogen atom or a reacted modifying reactant, and at least one of $R_1$ and $R_2$ represents the reacted modifying reactant; or

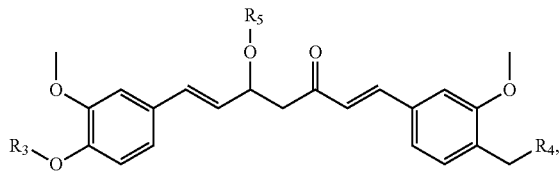

Formula (II)

wherein $R_5$ represents a reacted modifying reactant, and $R_3$ and $R_4$ represent a hydrogen atom or a reacted modifying reactant.

According to the contact lens product 100 of the present disclosure, when a weight percentage concentration of the curcuminoid in the contact lens 110 is Ccu, and a weight percentage concentration of the antioxidant in the buffer solution 120 is Cao, the following condition is satisfied: 0.01≤Ccu/Cao≤10.00. Furthermore, the following condition can be satisfied: 0.02≤Ccu/Cao≤8.00. Furthermore, the following condition can be satisfied: 0.03≤Ccu/Cao≤3.00. Furthermore, the following condition can be satisfied: 0.04≤Ccu/Cao≤1.00. Furthermore, the following condition can be satisfied: 0.05≤Ccu/Cao≤0.70.

Therefore, by the arrangements that the contact lens 110 of the contact lens product 100 of the present disclosure is designed to include at least one novel curcuminoid obtained by modifying the natural curcumin and with high monomer binding efficiency, and the curcuminoid of the present disclosure has the ability to absorb light and to quickly change the color thereof, it is favorable for converting the UV light or the blue light with high energy in the environment to a light with low energy so as to protect the retina and reduce the damage thereto. Furthermore, the contact lens product 100 of the present disclosure is further designed to include an antioxidant with a proper concentration, so that the problem of destroying the stability of the curcuminoid of the contact lens product 100 due to high-temperature and high-pressure sterilization can be overcome. Furthermore, the original absorbing efficiency of the curcuminoid of the present disclosure can be stabilized and prolonged by the optimal combination of the antioxidant concentration in the buffer solution 120. Thus, a full play of the anti-glare protection effect of the contact lens 100 can be performed. Furthermore, the curcuminoid of the contact lens 110 of the present disclosure can be mixed with pigments so as to achieve different color changing types according to actual needs. Thus, the contact lens 110 can be further applied to a multifocal contact lens for slowing down or controlling a progression of vision, so that the effects of stray light reducing and the glare eliminating of the multifocal contact lens can be obtained. Moreover, by adjusting the concentration of the curcuminoid appropriately, it is favorable for blocking the strong light so as to obtain an efficient shading effect. However, the present disclosure is not limited thereto.

According to the contact lens product 100 of the present disclosure, at least one of $R_1$ and $R_2$ of the curcuminoid represented by Formula (I) is 2-hydroxyethyl methacrylate, and at least one of R3 and R4 of the curcuminoid represented by Formula (II) is 2-hydroxyethyl methacrylate. Therefore, the compatibility of the curcuminoid during the manufacturing process of the contact lens 110 can be enhanced, so that the curcuminoid can be bond to the monomers of the material directly and has an excellent binding efficiency to the monomers.

According to the contact lens product 100 of the present disclosure, $R_5$ of the curcuminoid represented by Formula (II) can be methacrylic acid or glycerol monomethacrylate. Therefore, a better binding efficiency to the monomers can be obtained, and it is favorable for enhancing the binding compatibility of the curcuminoid with the monomers of the material.

According to the contact lens product 100 of the present disclosure, when the weight percentage concentration of the curcuminoid in the contact lens 110 is Ccu, the following condition can be satisfied: 0.01%≤Ccu≤5.00%. Therefore, the absorbing effect to the wavelength with high energy of the curcuminoid of the contact lens 110 can be prolonged effectively. Furthermore, the following condition can be satisfied: 0.02%≤Ccu≤4.00%. Furthermore, the following condition can be satisfied: 0.03%≤Ccu≤3.00%. Furthermore, the following condition can be satisfied: 0.04%≤Ccu≤2.00%. Furthermore, the following condition can be satisfied: 0.04%≤Ccu≤1.00%.

According to the contact lens product 100 of the present disclosure, when the weight percentage concentration of the antioxidant in the buffer solution 120 is Cao, the following condition can be satisfied: 0.05%≤Cao≤5.00%. Therefore, the absorbing effect to the wavelength with high energy of the curcuminoid of the contact lens 110 can be prolonged effectively. Furthermore, the following condition can be satisfied: 0.06%≤Cao≤4.00%. Furthermore, the following condition can be satisfied: 0.07%≤Cao≤3.00%. Furthermore, the following condition can be satisfied: 0.08%≤Cao≤2.00%. Furthermore, the following condition can be satisfied: 0.09%≤Cao≤1.50%.

According to the contact lens product 100 of the present disclosure, the buffer solution 120 can further include a wetting agent, and the wetting agent is applied in the buffer solution 120. A weight percentage concentration of the wetting agent is Cad, wherein the concentration is defined as a weight percentage concentration of any kind of the wetting agent, and the following condition can be satisfied: 0.001%≤Cad≤1.00%. Therefore, the moisturizing and lubricating effects of the contact lens 110 can be provided. Furthermore, the following condition can be satisfied: $0.01\% \leq Cad \leq 0.50\%$.

According to the contact lens product 100 of the present disclosure, when a molecular weight of the curcuminoid is Wmc, the following condition can be satisfied: $400 \leq Wmc \leq 800$. Therefore, it is favorable for maintaining the absorbing effects of the curcuminoid and enhancing the binding efficiency to the monomers by the best structural combination thereof. Furthermore, the following condition can be satisfied: $410 \leq Wmc \leq 750$. Furthermore, the following condition can be satisfied: $420 \leq Wmc \leq 700$. Furthermore, the following condition can be satisfied: $430 \leq Wmc \leq 600$. Furthermore, the following condition can be satisfied: $450 \leq Wmc \leq 500$.

According to the contact lens product 100 of the present disclosure, when at least one day after the contact lens 110 is sterilized, and an average transmittance of the contact lens 110 in a wavelength range of 280 nm-310 nm is T2831, the following condition can be satisfied: $50\% \leq T2831 \leq 90\%$. Therefore, by properly adjusting the using amount of the curcuminoid, it is favorable for effectively enhancing the absorbing effect of the contact lens 110 in the wavelength range of UVB light. Furthermore, the following condition can be satisfied: $60\% \leq T2831 \leq 88\%$. Furthermore, the following condition can be satisfied: $70\% \leq T2831 \leq 86\%$. Furthermore, the following condition can be satisfied: $72\% \leq T2831 \leq 80\%$.

According to the contact lens product 100 of the present disclosure, when at least one day after the contact lens 110 is sterilized, and an average transmittance of the contact lens 110 in a wavelength range of 310 nm-380 nm is T3138, the following condition can be satisfied: $60\% \leq T3138 \leq 92\%$. Therefore, by properly adjusting the using amount of the curcuminoid, it is favorable for effectively enhancing the absorbing effect of the contact lens 110 in the wavelength range of UVA light. Furthermore, the following condition can be satisfied: $60\% \leq T3138 \leq 85\%$. Furthermore, the following condition can be satisfied: $75\% \leq T3138 \leq 85\%$.

According to the contact lens product 100 of the present disclosure, when at least one day after the contact lens 110 is sterilized, and an average transmittance of the contact lens 110 in a wavelength range of 410 nm-460 nm is T4146, the following condition can be satisfied: $70\% \leq T4146 \leq 90\%$. Therefore, by properly adjusting the using amount of the curcuminoid, it is favorable for effectively enhancing the absorbing effect of the contact lens 110 in the wavelength range of blue light. Furthermore, the following condition can be satisfied: $75\% \leq T4146 \leq 85\%$. Furthermore, the following condition can be satisfied: $80\% \leq T4146 \leq 90\%$.

According to the contact lens product 100 of the present disclosure, when at least one day after the contact lens 110 is sterilized, and an average transmittance of the contact lens 110 in a wavelength range of 460 nm-780 nm is T4678, the following condition can be satisfied: $90\% \leq T4678 \leq 98\%$. Therefore, by properly adjusting the using amount of the curcuminoid, it is favorable for effectively maintaining a high light transmitting effect of the contact lens 110.

According to the contact lens product 100 of the present disclosure, when at least one day after the contact lens 110 is sterilized, and an average transmittance of the contact lens 110 in a wavelength range of 380 nm-780 nm is T3878, the following condition can be satisfied: $85\% \leq T3878 \leq 98\%$. Therefore, by properly adjusting the using amount of the curcuminoid, it is favorable for effectively balancing the absorbing effect and the high light transmitting effect of the curcuminoid of the contact lens 110.

According to the contact lens product 100 of the present disclosure, when at least one day after the contact lens 110 is sterilized, and an absorbing blocking effectiveness of the contact lens 110 in the wavelength range of 280 nm-310 nm is BE2831, the following condition can be satisfied: $4.0\% \leq BE2831 \leq 50.0\%$. Therefore, it is favorable for effectively maintaining the absorbing effect to the high-energy UVB light of the contact lens 110. Furthermore, the following condition can be satisfied: $5.0\% \leq BE2831 \leq 50.0\%$. Furthermore, the following condition can be satisfied: $5.0\% \leq BE2831 \leq 40.0\%$. Furthermore, the following condition can be satisfied: $6.0\% \leq BE2831 \leq 30.0\%$. Furthermore, the following condition can be satisfied: $7.5\% \leq BE2831 \leq 20.0\%$. Furthermore, the following condition can be satisfied: $10.0\% \leq BE2831 \leq 50.0\%$.

According to the contact lens product 100 of the present disclosure, when at least one day after the contact lens 110 is sterilized, and an absorbing blocking effectiveness of the contact lens 110 in the wavelength range of 310 nm-380 nm is BE3138, the following condition can be satisfied: $3.0\% \leq BE3138 \leq 35.0\%$. Therefore, it is favorable for effectively maintaining the absorbing effect to the high-energy UVA light of the contact lens 110. Furthermore, the following condition can be satisfied: $3.5\% \leq BE3138 \leq 30.0\%$. Furthermore, the following condition can be satisfied: $5.0\% \leq BE3138 \leq 35.0\%$. Furthermore, the following condition can be satisfied: $7.5\% \leq BE3138 \leq 35.0\%$. Furthermore, the following condition can be satisfied: $10.0\% \leq BE3138 \leq 20.0\%$.

According to the contact lens product 100 of the present disclosure, when at least one day after the contact lens 110 is sterilized, and an absorbing blocking effectiveness of the contact lens 110 in the wavelength range of 410 nm-460 nm is BE4146, the following condition can be satisfied: $1.0\% \leq BE4146 \leq 30.0\%$. Therefore, it is favorable for effectively maintaining the absorbing effect to the high-energy blue light of the contact lens 110. Furthermore, the following condition can be satisfied: $1.5\% \leq BE4146 \leq 27.0\%$. Furthermore, the following condition can be satisfied: $2.0\% \leq BE4146 \leq 25.0\%$. Furthermore, the following condition can be satisfied: $2.5\% \leq BE4146 \leq 23.0\%$. Furthermore, the following condition can be satisfied: $5.0\% \leq BE4146 \leq 20.0\%$.

According to the contact lens product 100 of the present disclosure, when at least one day after the contact lens 110 is sterilized, and an absorbing blocking effectiveness of the contact lens 110 in the wavelength range of 460 nm-780 nm is BE4678, the following condition can be satisfied: $0.5\% \leq BE4678 \leq 5.0\%$. Therefore, it is favorable for effectively maintaining the high light transmitting effect of the contact lens 110.

According to the contact lens product 100 of the present disclosure, when at least one day after the contact lens 110 is sterilized, and an absorbing blocking effectiveness of the contact lens 110 in the wavelength range of 380 nm-780 nm is BE3878, the following condition can be satisfied: $1.0\% \leq BE3878 \leq 10.0\%$. Therefore, it is favorable for effectively balancing the absorbing effect and the high light transmitting effect of the curcuminoid of the contact lens 110.

According to the contact lens product 100 of the present disclosure, the contact lens 110 can further include at least two curcuminoids. Therefore, it is favorable for achieving different color changing types by mixing a plurality of curcuminoids according to the desired effect of color changes.

According to the contact lens product 100 of the present disclosure, the contact lens 110 can further include at least one pigment. Therefore, a color changeable region of the contact lens 110 of the present disclosure can include a mixed pigment of the curcuminoid, so that different color changing types of the color changeable region can be achieved according to actual needs. Furthermore, if the color changeable region is designed to be smaller than the ring of the optical region, it is favorable for reducing the stray light, and an anti-strong light effect can be obtained when that is applied to multifocal contact lens for controlling a progression of vision. Furthermore, if a shape of the color changeable region is designed as disc-shaped and covered the optical region, it is favorable for blocking the strong light and providing the dimming effect as that of sunglasses. Moreover, if the color changeable region is further designed in the outer area of the non-optical region, it is favorable for adjusting the appearance of contact lens 110 to achieve the magnification of iris.

Furthermore, according to the contact lens product 100 of the present disclosure, the pigment of the contact lens 110 can forms as a pattern. The pattern can include words, numbers, or drawings. Therefore, the pattern can have directivity and representative functions, and the identification marks, expiration indications, direction identification, indicating environmental hazard status, etc., can be shown thereon.

According to the contact lens product 100 of the present disclosure, the contact lens 110 can include at least three lens layers. Therefore, it is favorable for avoiding the pigments from leaking out of the contact lens 110, and thus the probability that the chemical molecules contact with eyes can be reduced.

According to the contact lens product 100 of the present disclosure, the contact lens product 100 can be a daily disposable product, and the contact lens product 100 can further include a light-proof package. In detail, due to the luminous effect of the curcuminoid may be faded over time after irradiating by light, the contact lens 110 should be used within the time period that the curcuminoid has a maximum activity so as to maintain the best shading or dimming effect. Accordingly, by the light-proof package which can completely block the light, the curcuminoid in the contact lens 110 can be protected and maintained so as to preserve and maintain the best shading or dimming effect for long periods of time thereof.

The contact lens product 100 of the present disclosure is manufactured by the following steps: (1) A modified curcumin is synthesized from an unmodified curcumin according to specific synthesis steps; (2) The modified curcumin is added to a monomer composition with a specific formula and then mixed homogeneously; (3) The monomer mixture is homogenized and then curing by UV/heat so as to obtain the contact lens 110; (4) The finished product of the contact lens 110 is processed by a hydration step and then stored in the buffer solution 120; and (5) The sealed package including the contact lens 110 and the buffer solution 120 is sterilized under 121° C. for at least 20 minutes to obtain the contact lens product 100 of the present disclosure.

According to the contact lens product 100 of the present disclosure, the transmittance of the contact lens 110 in a specific wavelength range is measured by the following steps: (1) The contact lens 110 is equilibrated in a standard solution; and (2) The contact lens 110 as well as the standard solution is placed in the quartz dish, and the transmittance of the contact lens 110 is measured under the condition that the scanning accuracy is 1 nm, and the scanning range is in a wavelength range of 200 nm-800 nm.

Each of the aforementioned features of the contact lens product can be utilized in various combinations for achieving the corresponding effects.

The function of the contact lens of the present disclosure can be myopia correction, hyperopia correction, presbyopia correction, astigmatism correction, myopia control, corneal reshaping, etc.

The diopter of the contact lens of the present disclosure is presented by "D". For example, a center diopter of a contact lens for correcting myopia is negative, and a center diopter of a contact lens for correcting hyperopia is positive. Furthermore, an aggravation of myopia described in the present disclosure means that the degree of myopia is deepened, and the absolute value of the negative diopter become greater, such as −0.5 D increased/deepened to −2.0 D.

The surface type of the contact lens of the present disclosure, such as spheric, plane or aspheric, is based on a shape of the curved surface shown in a cross-sectional view through a center thereof. Furthermore, the front surface of the contact lens of the present disclosure means a surface away from the cornea of the eyeball, and the back surface thereof means a surface close to the cornea of the eyeball.

The stability structure of the contact lens of the present disclosure can include a rotating stabilizing design, such as a lower weighted design by thickening on the lower part of the contact lens, a balanced design by thickening on both sides thereof, an asymmetrical balanced design thereof, a stable design by thinning the upper and lower portions thereof, etc.

The contact lens of the present disclosure can include at least two lens layers. The colored contact lens can be composed of two lens layers, such as the lens body layer and the color layer. The colored contact lens can be composed of three lens layers, such as the lens body layer, the color layer, and the anti-shedding protective layer. The colored contact lens can be composed of four lens layers, such as the lens body layer, the first color layer, the second color layer, and the anti-shedding protective layer. The colored contact lens can be composed of five lens layers, such as the lens body layer, the first color layer, the second lens layer, the third lens layer, and the anti-shedding protective layer. The colored contact lens can be composed of another type of five lens layers, such as the lens body layer, the first color layer, the spacer layer, the second lens layer, and the anti-shedding protective layer.

The composition of the contact lens of the present disclosure includes at least two monomers, at least one cross-linking agent, at least one diluent and at least one initiator, and can selectively include UV (Ultraviolet) light absorber or blue light absorber. Therefore, the kinds and the ingredients of the composition can be selected and adjusted, and it is favorable for adjusting the coefficient of elasticity of the contact lens and then affecting the hardness degree thereof. Accordingly, the durability and the stability of the contact lens can be further enhanced, and the moisture content of the contact can be adjusted appropriately so as to enhance the comfort and the oxygen permeability. Further, the composition can include at least four kinds of monomers, at least two kinds of cross-linking agents, at least two kinds of diluents and at least one initiator, and can selectively include UV light absorber or blue light absorber. Therefore, a contact lens made of a first material and a second material simultaneously can be obtained.

The monomer of a hydrogel of the contact lens of the present disclosure can include 2-hydroxyethyl methacrylate (HEMA), methacrylic acid (MAA), glycerol monomethacrylate (GMA), N-vinyl-2-pyrrolidinone (NVP), methyl methacrylate (MMA), N,N-dimethyl Acrylamide (DMAA), etc. Therefore, it is favorable for maintaining the feelings of moisture, smoothness, softness and comfort of the contact lens, so that the contact lens can be worn for a long time, and the foreign body sensation in wearing can be avoided.

The hydrogel of the contact lens of the present disclosure can be but not limited to the contact lens material classified as Group I by U.S. FDA (U.S. Food and Drug Administration), i.e., nonionic polymers having a low moisture content (less than 50 wt %), such as Helfilcon A&B, Hioxifilcon B, Mafilcon, Polymacon, Tefilcon, and Tetrafilcon A. Furthermore, the hydrogel can be but not limited to the contact lens material classified as Group II by U.S. FDA, i.e., nonionic polymers having a high moisture content (greater than 50 wt %), such as Acofilcon A, Alfafilcon A, Hilafilcon B, Hioxifilcon A, Hioxifilcon B, Hioxifilcon D, Nelfilcon A, Nesofilcon A, Omafilcon A, and Samfilcon A. Furthermore, the hydrogel can be but not limited to the contact lens material classified as Group III by U.S. FDA, i.e., ionic polymers having a low moisture content (less than 50 wt %), such as Deltafilcon A. Furthermore, the hydrogel can be but not limited to the contact lens material classified as Group IV by U.S. FDA, i.e., ionic polymers having a high moisture content (greater than 50 wt %), such as Etafilcon A, Focofilcon A, Methafilcon A, Methafilcon B, Ocufilcon A, Ocufilcon B, Ocufilcon C, Ocufilcon D, Ocufilcon E, Phemfilcon A, and Vifilcon A.

The monomer of a silicone hydrogel of the contact lens of the present disclosure can be but not limited to 2-hydroxyethyl methacrylate, glycerol monomethacrylate, methacrylic acid, 3-methacryloyloxypropyltris(trimethylsilyloxy) silane, N-vinyl-2-pyrrolidinone, N,N-dimethyl acrylamide, 3-(3-methacryloxy-2-hydroxypropoxy)propylbis(trimethylsiloxy)methylsilane, or (3-acryloxy-2-hydroxypropoxypropyl) terminated polydimethylsiloxane. Therefore, it is favorable for balancing the parameters of durability, stability, comfort, and oxygen permeability of the contact lens by selecting appropriate types of monomers. Thus, the oxygen permeability of the contact lens can be effectively enhanced, so that the symptoms of red eyes, bloodshot eyes, redness and swelling caused by the corneal hypoxia can be prevented so as to provide comfortability in a long time wearing.

The silicone hydrogel of the contact lens of the present disclosure can be but not limited to the contact lens material classified as Group V by U.S. FDA, such as Balafilcon A, Comfilcon A, Efrofilcon A, Enfilcon A, Galyfilcon A, Lotrafilcon A, Lotrafilcon B, Narafilcon A, Narafilcon B, Senofilcon A, Delefilcon A, and Somofilcon A.

The product of the contact lens of the present disclosure can be composed of a mainbody of the contact lens, a solution and a package. The mainbody of the contact lens or the solution can include a monomer, a UV light absorber, a blue light absorber, a beneficial agent, a wetting agent, a dye, a myopia control agent, a weak acid and its conjugate base, a weak base and its conjugate acid, an anionic agent, a cationic agent and other beneficial agents. The package of the present disclosure can be made by assembling a plastic container and an aluminum foil cover, wherein the plastic container can be made of polypropylene (PP), polystyrene (PS), polyethylene terephthalate (PET) or other plastic materials. Further, it also can be made of biodegradable plastic materials, such as polylactic acid (PLA), polyhydroxyalkanoates (PHA) or other degradable plastic materials. Furthermore, the biodegradable plastic material can also be mixed with biodegradable plasticizers to achieve effects of modification. The aluminum foil cover of the present disclosure can be a composite aluminum foil material with a plastic coating.

The initiator of the contact lens of the present disclosure can be but not limited to 2-hydroxy-2-methyl-propiophenone. Therefore, the polymerization with high efficiency of the composition of the contact lens can be achieved.

The cross-linking agent of the contact lens of the present disclosure can be but not limited to ethylene glycol dimethacrylate or 1,1,1-trimethylol propane trimethacrylate. Therefore, a good linking efficiency among monomers can be obtained so as to enhance the stability and the durability of the contact lens.

The diluent of the contact lens of the present disclosure can be polyethylene glycol 300, polyethylene glycol 600, polyethylene glycol 600, polyethylene glycol 1000, polyethylene glycol 2000, polyethylene glycol 4000, 1,4-butanediol, ethanol, isopropyl alcohol, glycerol, or 1-hexanol. Therefore, it is favorable for adjusting the coefficient of elasticity of the contact lens, so that the wearing comfortability of the contact lens can be enhanced.

The UV light absorber of the contact lens of the present disclosure can be but not limited to 2-[3-(2H-benzotriazol-2-yl)-4-hydroxyphenyl]ethyl methacrylate, 4-methacryloxy-2-hydroxybenzophenone, 2-phenylethyl acrylate, 2-phenylethyl methacrylate, 2-(2'-hydroxy-5'-methacryloxyethylphenyl)-2H-benzotriazole, or 2-(4-benzoyl-3-hydroxyphenoxy) ethyl acrylate. Therefore, the contact lens can absorb the UV light with high energy so as to reduce the probability of retina damage by the UV light.

The blue light absorber of the contact lens of the present disclosure can be but not limited to 4-(phenyldiazenyl) phenyl methacrylate. Therefore, the contact lens can absorb the high-energy blue lights so as to reduce the probability of retina damage by the blue lights.

The wetting agent of the contact lens of the present disclosure can include 2-methacryloyloxyphosphorylcholine (MPC), hyaluronic acid, alginic acid, or the salts thereof, etc.

The dye of the contact lens of the present disclosure can include anthocyanidin, β-carotene, curcumin, luciferin, lutein, lycopene, phycobillin, phycoerythrim, phycocyanin, vitamin B2, zeaxanthin, photochromic dyes, thermochromic dyes, and the derivatives thereof.

The beneficial agents of the contact lens of the present disclosure can include antibiotics, bacteriostatic agents, antiviral agents, antifungal drugs, antiallergic agents, apomorphine, bromocriptine, dopamine receptor agonists, levodopa, quinpirole, steroids, non-steroidal anti-inflammatory agents (NSAIDs), surfactants, miotics, enzyme inhibitors, anaesthetics, vasoconstrictor, vitamins, antioxidants, nutrients, etc.

The antioxidant of the contact lens of the present disclosure can be vitamin A, vitamin C, vitamin E, uric acid, carotenoids, flavonoids, resveratrol, selenomethionine, etc.

The myopia control agent of the contact lens of the present disclosure can include cycloplegic agent, mydriatics, selective/non-selective muscarinic receptor antagonists, etc. The myopia control agent has the effect of controlling, slowing, delaying or preventing myopia from worsening. For example, it can block the M-type muscarinic receptors of the parasympathetic nerve so as to relax and paralyze the ciliary muscles that control the pupils, thereby dilating the pupils. The myopia control agent can be atropine ((3-endo)-8-Methyl-8-azabicyclo[3.2.1]oct-3-yltropate), atropine sulphate, cyclopentolate (2-(dimethylamino)ethyl(1-hydroxycyclopentyl)(phenyl)acetate), cyclopentolate HCl, eucatropine (1,2,2,6-tetramethyl-4-piperidinylhydroxy(phenyl)acetate), homatropine ((3-endo)-8-methyl-8-azabicyclo[3.2.1]oct-3-ylhydroxy(phenyl)acetate), nuvenzepine, phenylephrine HCl, pirenzepine, raceanisodamine, rispenzepine, scopolamine ((1R,2R,4S,5S,7s)-9-methyl-3-oxa-9-azatricyclo[3.3.1.02,4]non-7-yl(2S)-3-hydroxy-2-phenylpropanoate), scopolamine HBr, telenzepine, tropicamide (N-ethyl-3-hydroxy-2-phenyl-N-(4-pyridinylmethyl)propanamide), and the salts thereof.

Each of the aforementioned features of the contact lens product can be utilized in various combinations for achieving the corresponding effects.

According to the embodiments, specific embodiments are set below and described in detail in conjunction with the drawings.

1st Embodiment to 4th Embodiment

In the contact lens products according to the 1st embodiment to the 4th embodiment, the curcuminoid of the contact lens is represented by Formula (1), and the details of the curcuminoid of the 1st embodiment to the 4th embodiment are shown in Table 1.

TABLE 1

| Curcuminoid | Curcumin + HEMA*1 |
|---|---|
| Structure | [chemical structure of Formula (1)] |
| SMILES Notation | COC1=C(O)C=CC(\C=C\C(=O)C=C(OCCOC(=O)C(C)=C)\C=C\C2=CC(OC)=C(O)C=C2)=C1 |
| Molecular Formula | $C_{27}H_{28}O_8$ |
| Molecular weight Wmc (g/mol, Dalton) | 480 |

In the contact lens products of the 1st embodiment to the 4th embodiment, the antioxidant of the buffer solution is vitamin C, and the wetting agents are hyaluronic acid (HA) and sodium alginate (SA). The values of the parameters of Ccu, Cao, Cad and Ccu/Cao of the 1st embodiment to the 4th embodiment are shown in Table 2.

TABLE 2

|  |  | 1st embodiment | 2nd embodiment | 3rd embodiment | 4th embodiment |
|---|---|---|---|---|---|
| Ccu (%) | | 0.05 | 0.50 | 0.05 | 0.50 |
| Cao (%) | | 0.10 | 0.10 | 1.00 | 1.00 |
| Cad (%) | HA | 0.01 | 0.01 | 0.03 | 0.06 |
|  | SA | 0.01 | 0.01 | 0.05 | 0.06 |
| Ccu/Cao | | 0.50 | 5.00 | 0.05 | 0.50 |

5th Embodiment to 8th Embodiment

In the contact lens products according to the 5th embodiment to the 8th embodiment, the curcuminoid of the contact lens is represented by Formula (2), and the details of the curcuminoid of the 5th embodiment to the 8th embodiment are shown in Table 3.

TABLE 3

| Curcuminoid | Curcumin + HEMA*1 |
|---|---|
| Structure | Formula (2) (H₃CO, OCH₃, OH structure shown) |
| SMILES Notation | COC1=C(O)C=CC(\C=C\C(=O)CC(=O)\C=C\C2=CC(OC)=C(OCCOC(=O)C(C)=C)C=C2)=C1 |
| Molecular Formula | $C_{27}H_{28}O_8$ |
| Molecular weight Wmc (g/mol, Dalton) | 480 |

In the contact lens products of the 5th embodiment to the 8th embodiment, the antioxidant of the buffer solution is vitamin C, and the wetting agents are hyaluronic acid and sodium alginate. The values of the parameters of Ccu, Cao, Cad and Ccu/Cao of the 5th embodiment to the 8th embodiment are shown in Table 4.

TABLE 4

|  |  | 5th embodiment | 6th embodiment | 7th embodiment | 8th embodiment |
|---|---|---|---|---|---|
| Ccu (%) |  | 0.05 | 0.50 | 0.05 | 0.50 |
| Cao (%) |  | 0.10 | 0.10 | 1.00 | 1.00 |
| Cad (%) | HA | 0.01 | 0.01 | 0.03 | 0.06 |
|  | SA | 0.01 | 0.01 | 0.05 | 0.06 |
| Ccu/Cao |  | 0.50 | 5.00 | 0.05 | 0.50 |

Figure 2:
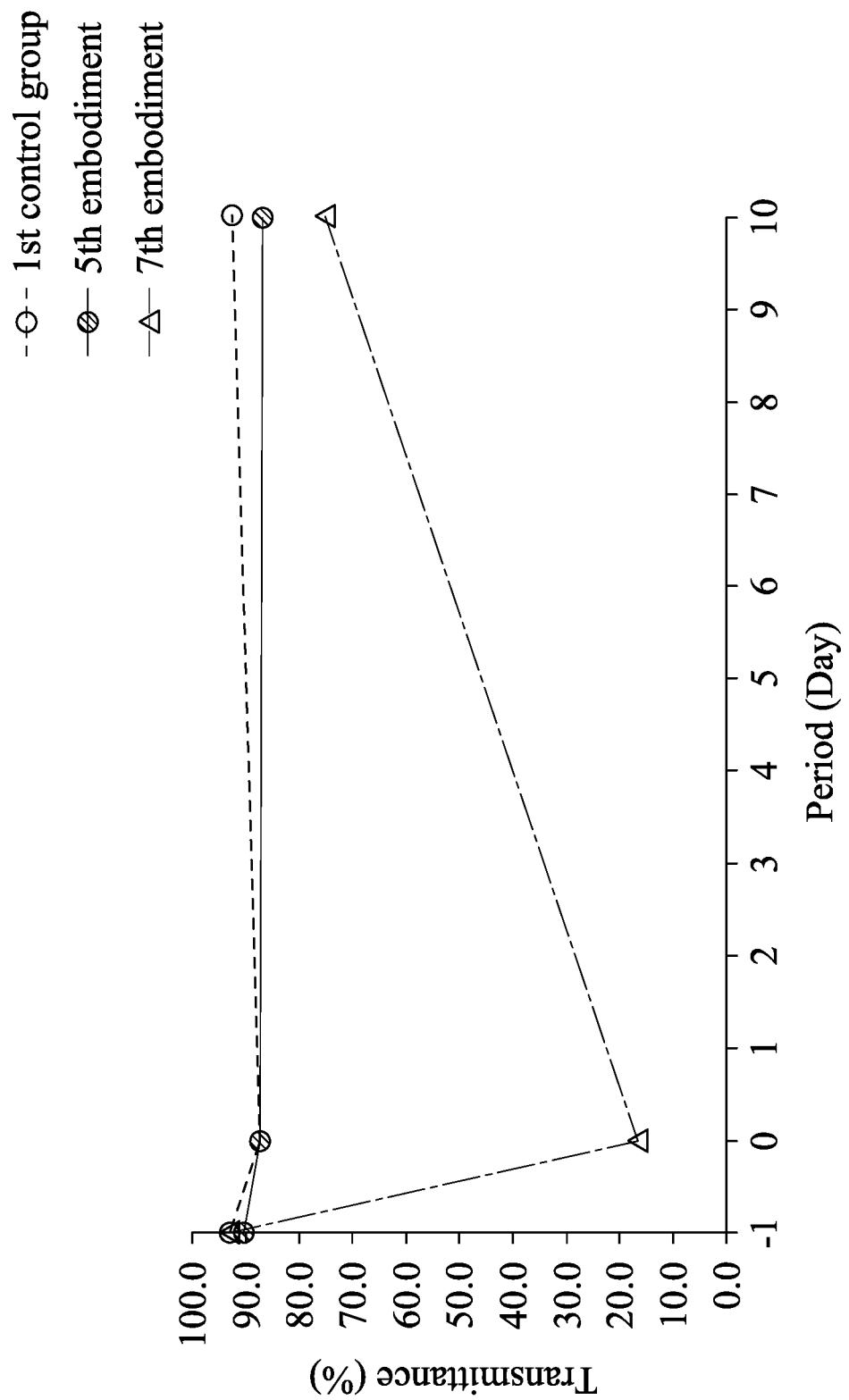
FIG. 2 shows a graph of transmittances in a wavelength range of 280 nm-310 nm of the 5th embodiment, the 7th embodiment and the 1st control group of the present disclosure.
Figure 3:
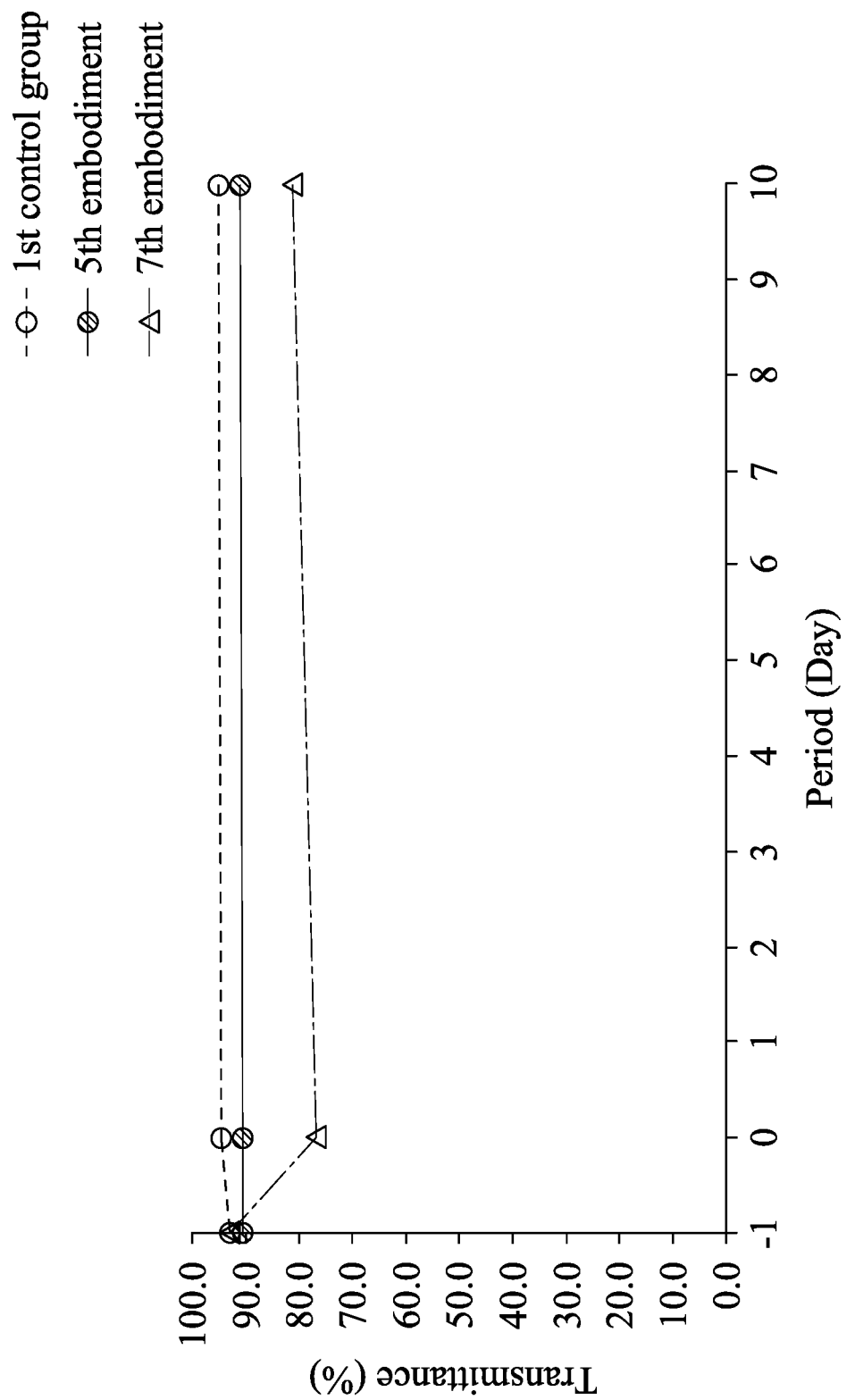
FIG. 3 shows a graph of transmittances in a wavelength range of 310 nm-380 nm of the 5th embodiment, the 7th embodiment and the 1st control group of the present disclosure.
Figure 4:
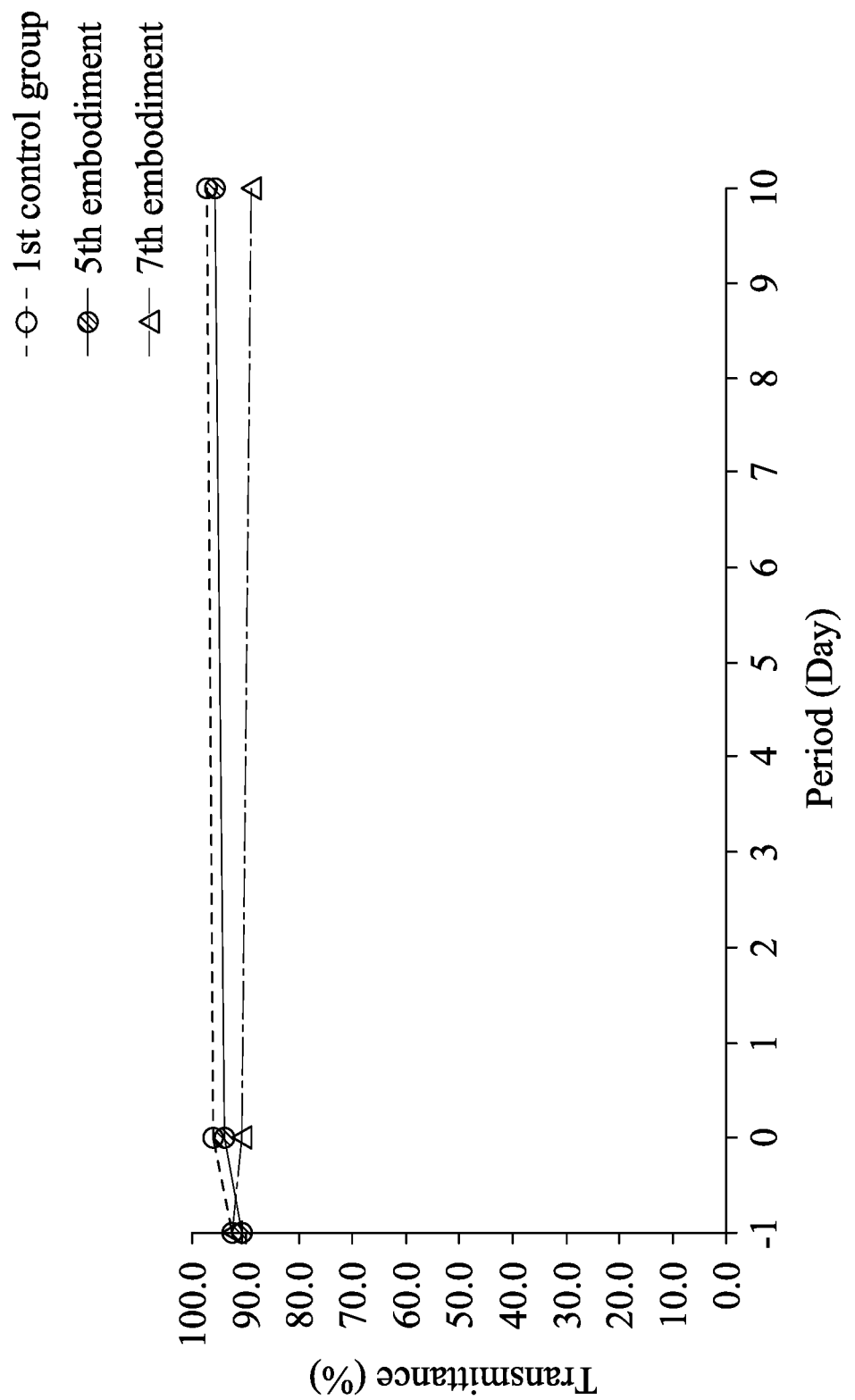
FIG. 4 shows a graph of transmittances in a wavelength range of 410 nm-460 nm of the 5th embodiment, the 7th embodiment and the 1st control group of the present disclosure.
Figure 5:
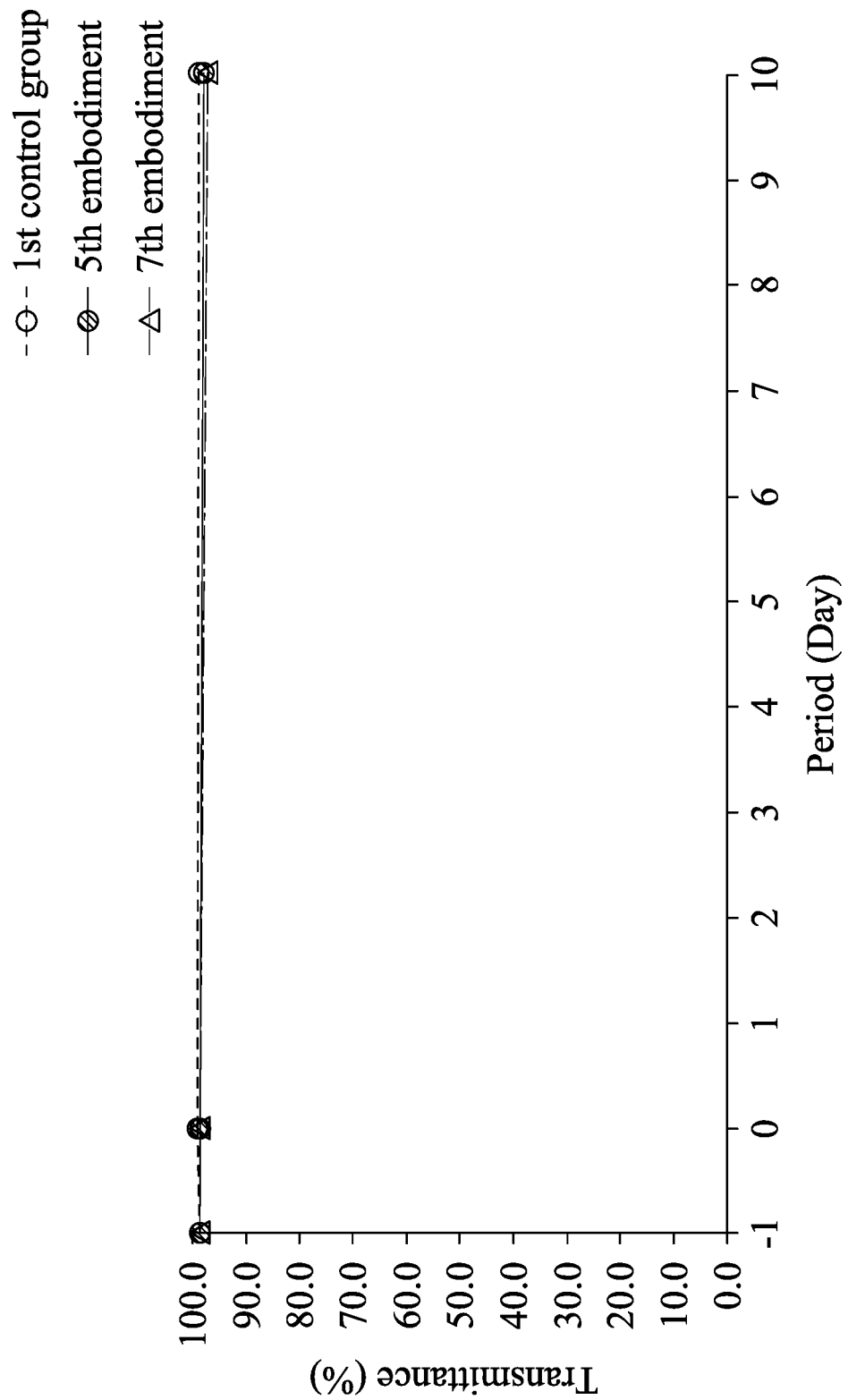
FIG. 5 shows a graph of transmittances in a wavelength range of 460 nm-780 nm of the 5th embodiment, the 7th embodiment and the 1st control group of the present disclosure.
Figure 6:
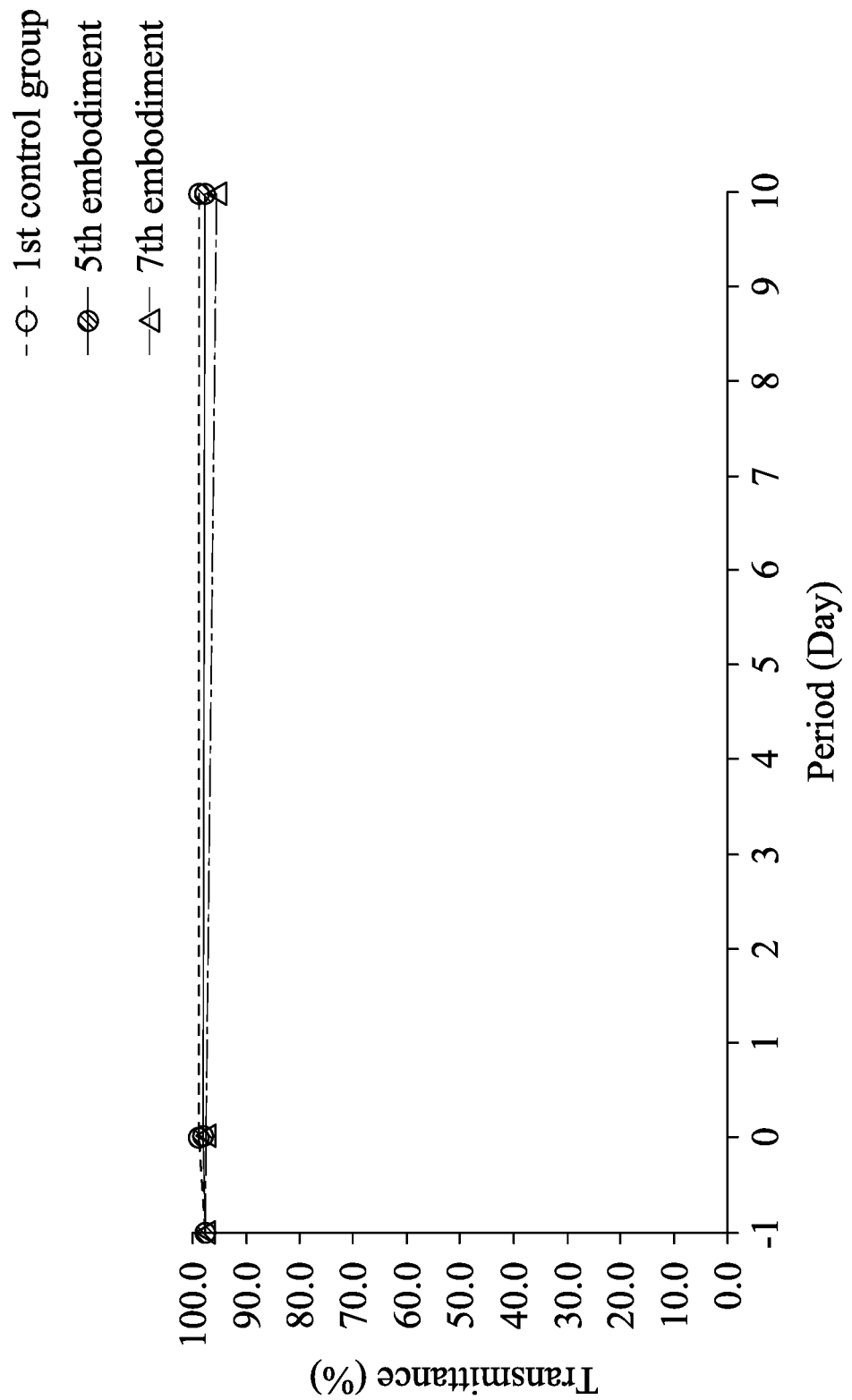
FIG. 6 shows a graph of transmittances in a wavelength range of 380 nm-780 nm of the 5th embodiment, the 7th embodiment and the 1st control group of the present disclosure.

FIG. 2 shows a graph of transmittances in the wavelength range of 280 nm-310 nm of the 5th embodiment, the 7th embodiment and the 1st control group of the present disclosure. FIG. 3 shows a graph of transmittances in the wavelength range of 310 nm-380 nm of the 5th embodiment, the 7th embodiment and the 1st control group of the present disclosure. FIG. 4 shows a graph of transmittances in the wavelength range of 410 nm-460 nm of the 5th embodiment, the 7th embodiment and the 1st control group of the present disclosure. FIG. 5 shows a graph of transmittances in the wavelength range of 460 nm-780 nm of the 5th embodiment, the 7th embodiment and the 1st control group of the present disclosure. FIG. 6 shows a graph of transmittances in the wavelength range of 380 nm-780 nm of the 5th embodiment, the 7th embodiment and the 1st control group of the present disclosure. Furthermore, in order to illustrate more clearly the effect of the contact lens product of the present disclosure after adding the antioxidant to the buffer solution in overcoming the destruction of the stability of the curcuminoid caused by the high-temperature and high-pressure sterilization, the 1st control group without the antioxidant is further provided so as to compared with the 5th embodiment and the 7th embodiment. The curcuminoid of the 1st control group is represented by Formula (2), and the following condition is satisfied: Ccu=0.05%.

The values of T2831, T3138, T4146, T4678 and T3878 of the 1st control group, the 5th embodiment and the 7th embodiment on the day before the sterilization (Day −1), the day of the sterilization (Day 0), and 10 days after the sterilization (Day 10) are shown in Table 5.

TABLE 5

|  | 1st control group | | | 5th embodiment | | | 7th embodiment | | |
|---|---|---|---|---|---|---|---|---|---|
|  | Antioxidant | | | | | | | | |
|  | 0% | | | Vitamin C 0.10% | | | Vitamin C 1.00% | | |
|  | Period of sterilization (Day) | | | | | | | | |
|  | −1 | 0 | 10 | −1 | 0 | 10 | −1 | 0 | 10 |
| T2831 | 93.2 | 87.7 | 92.6 | 90.4 | 87.4 | 86.8 | 93.4 | 16.7 | 75.4 |
| T3138 | 93.0 | 94.9 | 95.0 | 90.6 | 90.7 | 91.4 | 93.1 | 76.9 | 81.5 |
| T4146 | 92.5 | 96.2 | 97.3 | 90.7 | 94.2 | 95.7 | 92.8 | 90.8 | 89.1 |
| T4678 | 99.0 | 99.3 | 99.1 | 98.7 | 98.9 | 98.2 | 98.8 | 99.0 | 97.5 |
| T3878 | 97.7 | 98.7 | 98.7 | 97.1 | 97.8 | 97.6 | 97.5 | 97.1 | 95.5 |

Furthermore, the values of BE2831, BE3138, BE4146, BE4678 and BE3878 of the 5th embodiment and the 7th embodiment on the day of the sterilization and 10 days after the sterilization are further calculated. The aforementioned calculation is based on the values of T2831, T3138, T4146, T4678 and T3878 of the 1st control group and the 5th embodiment as well as the 1st control group and the 7th embodiment. In detail, the absorbing blocking effectiveness described in the present specification is a percentage difference between the average transmittances of the contact lens product including a curcuminoid (C) and the contact lens product without a curcuminoid (nC) in a particular wavelength range. For example, the formula for calculating the value of BE2831 based on the value of T2831 on 10 days after the sterilization is shown as follows, wherein BE2831 is the absorbing blocking effectiveness of the contact lens in the wavelength range of 280 nm-310 nm, and T2831 is the average transmittance of the contact lens in the wavelength range of 280 nm-310 nm:

BE2831 = (|($C_{T2831}$ − $nC_{T2831}$)|/$nC_{T2831}$) × 100, wherein $C_{T2831}$ is the value of the average transmittance T2831 of the contact lens product including a curcuminoid in the wavelength range of 280 nm-310 nm, and $nC_{T2831}$ is the value of the average transmittance T2831 of the contact lens product without a curcuminoid in the wavelength range of 280 nm-310 nm. The values of BE2831, BE3138, BE4146, BE4678 and BE3878 of the 1st control group and the 5th embodiment as well as the 1st control group and the 7th embodiment are shown in Table 6.

TABLE 6

| Period of sterilization | 1st control group and 5th embodiment | | 1st control group and 7th embodiment | |
|---|---|---|---|---|
| (Day) | 0 | 10 | 0 | 10 |
| BE2831 | 0.3 | 6.2 | 81.0 | 18.6 |
| BE3138 | 4.4 | 3.8 | 19.0 | 14.2 |
| BE4146 | 2.1 | 1.6 | 5.6 | 8.4 |
| BE4678 | 0.4 | 0.9 | 0.4 | 1.7 |
| BE3878 | 0.8 | 1.1 | 1.6 | 3.2 |

Figure 7:
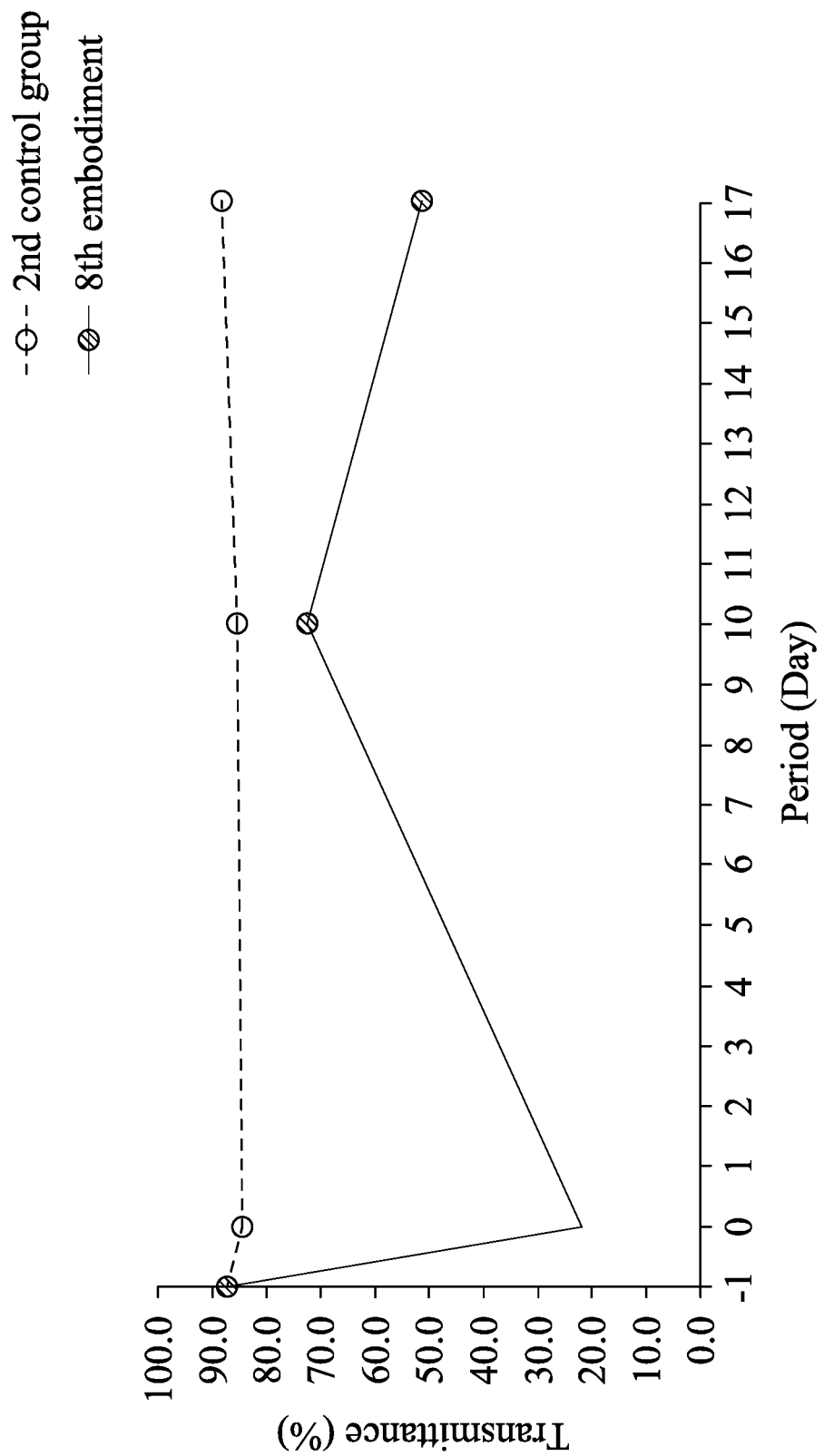
FIG. 7 shows a graph of transmittances in the wavelength range of 280 nm-310 nm of the 8th embodiment and the 2nd control group of the present disclosure.
Figure 8:
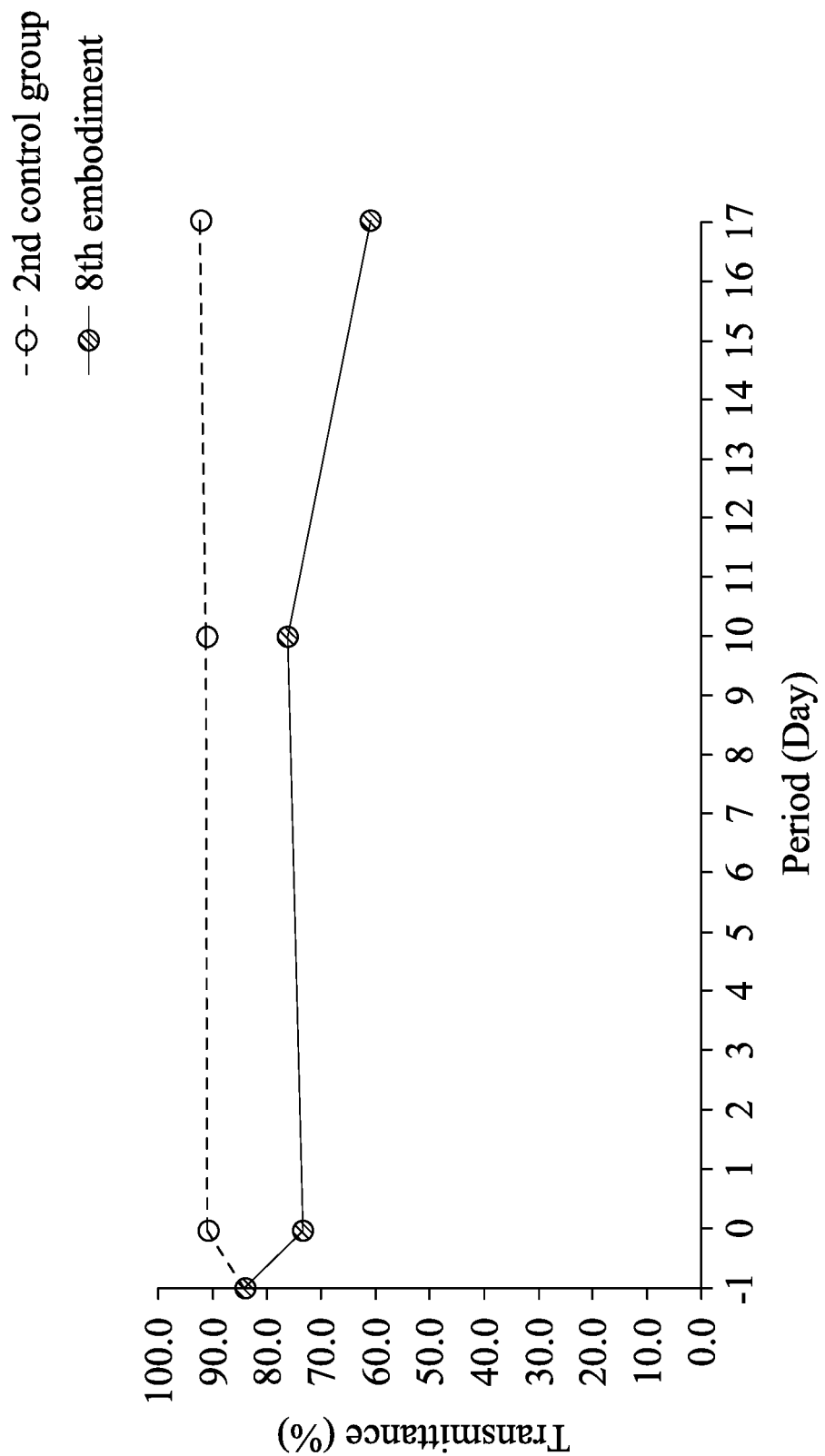
FIG. 8 shows a graph of transmittances in the wavelength range of 310 nm-380 nm of the 8th embodiment and the 2nd control group of the present disclosure.
Figure 9:
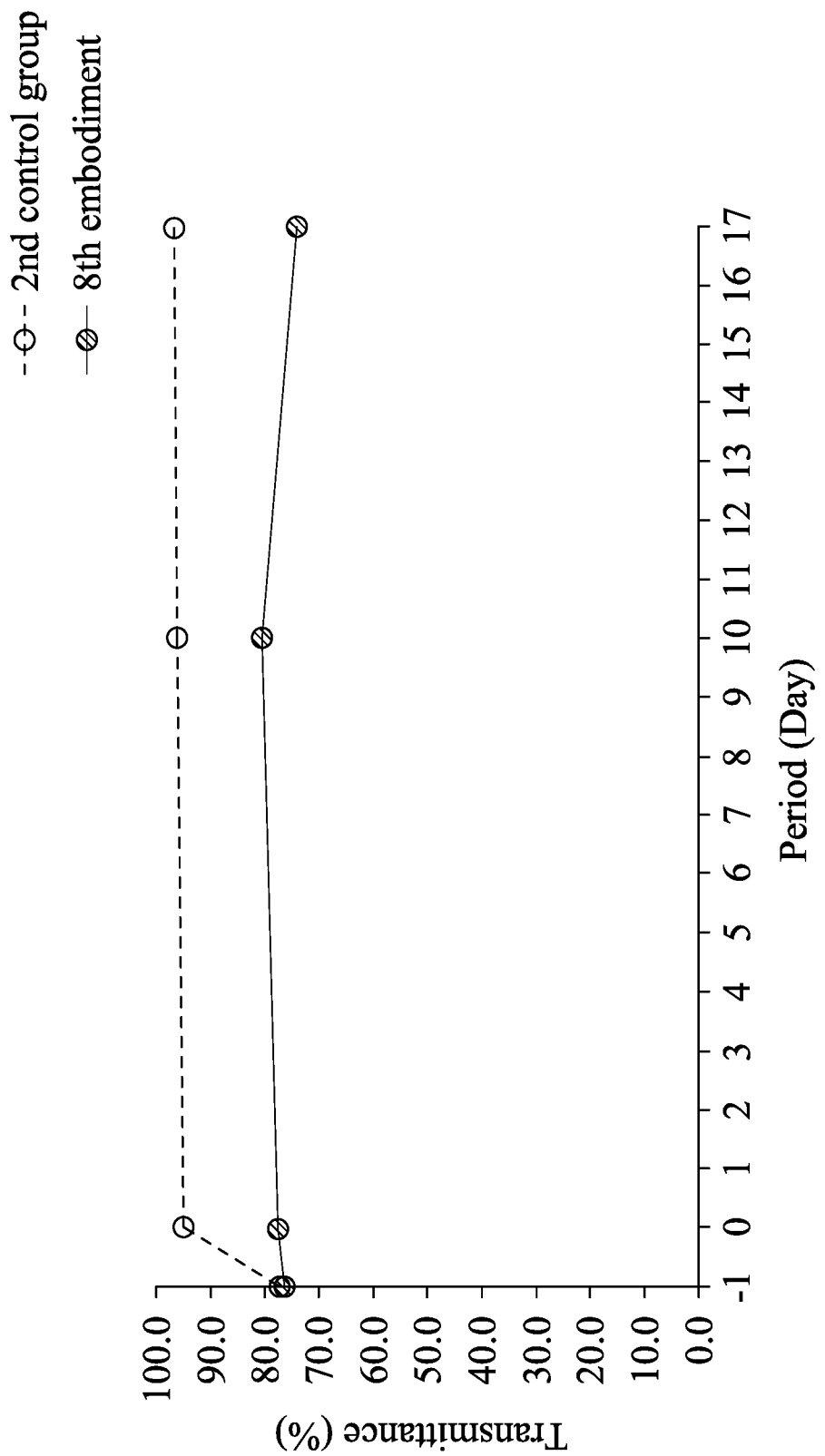
FIG. 9 shows a graph of transmittances in the wavelength range of 410 nm-460 nm of the 8th embodiment and the 2nd control group of the present disclosure.
Figure 10:
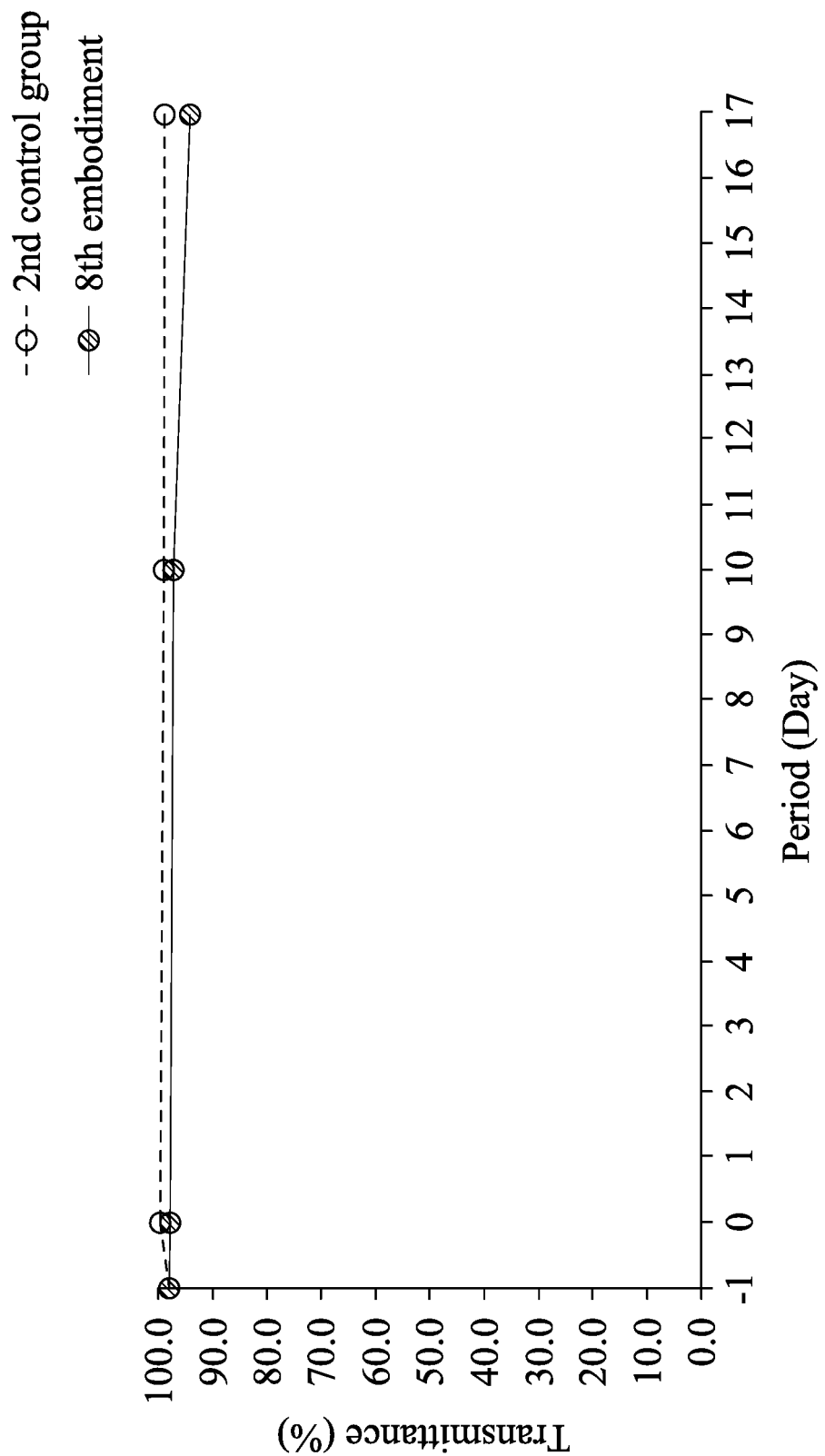
FIG. 10 shows a graph of transmittances in the wavelength range of 460 nm-780 nm of the 8th embodiment and the 2nd control group of the present disclosure.
Figure 11:
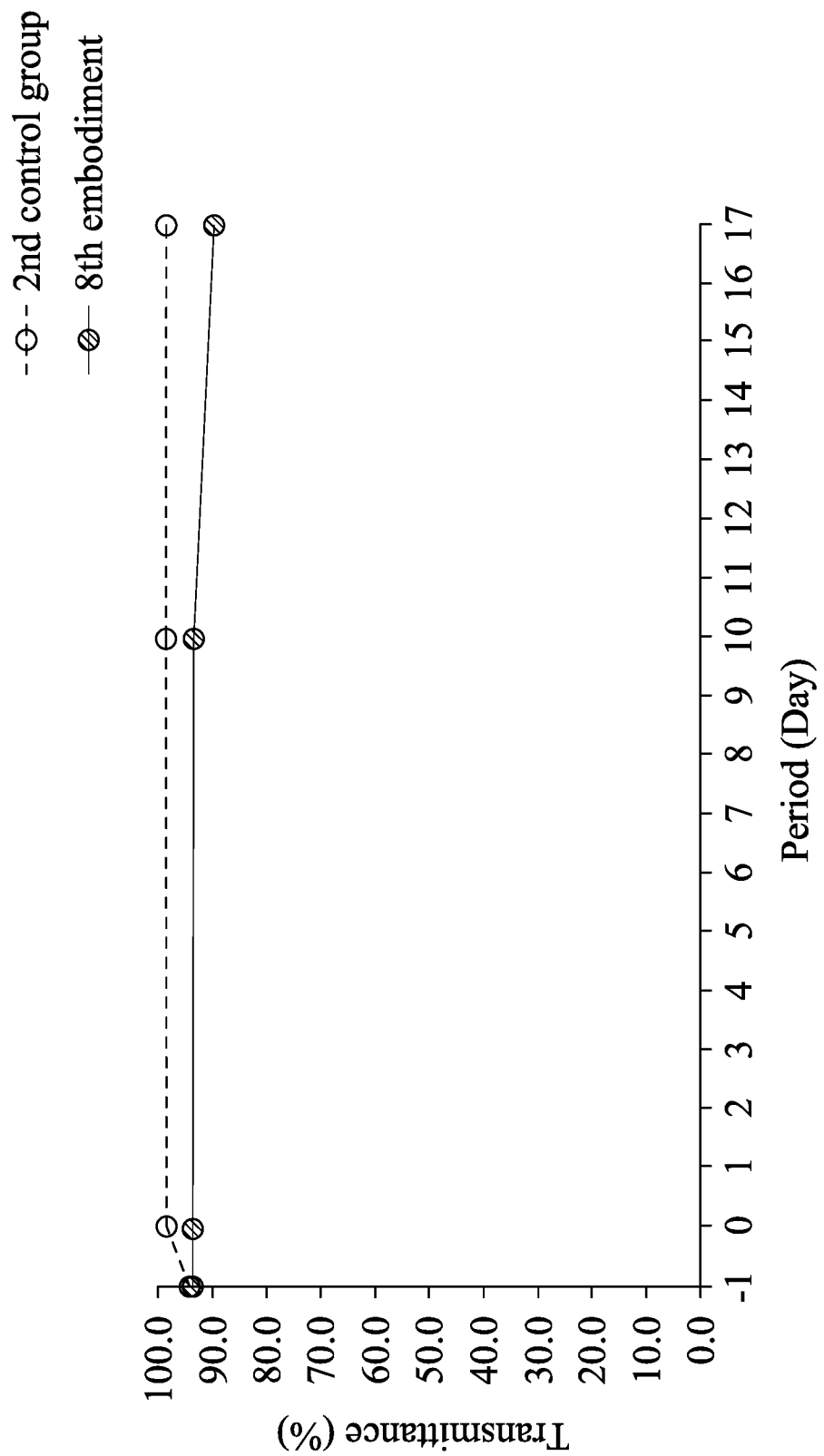
FIG. 11 shows a graph of transmittances in the wavelength range of 380 nm-780 nm of the 8th embodiment and the 2nd control group of the present disclosure.

FIG. 7 shows a graph of transmittances in the wavelength range of 280 nm-310 nm of the 8th embodiment and the 2nd control group of the present disclosure. FIG. 8 shows a graph of transmittances in the wavelength range of 310 nm-380 nm of the 8th embodiment and the 2nd control group of the present disclosure. FIG. 9 shows a graph of transmittances in the wavelength range of 410 nm-460 nm of the 8th embodiment and the 2nd control group of the present disclosure. FIG. 10 shows a graph of transmittances in the wavelength range of 460 nm-780 nm of the 8th embodiment and the 2nd control group of the present disclosure. FIG. 11 shows a graph of transmittances in the wavelength range of 380 nm-780 nm of the 8th embodiment and the 2nd control group of the present disclosure. Furthermore, in order to illustrate more clearly the effect of the contact lens product of the present disclosure after adding the antioxidant to the buffer solution in overcoming the destruction of the stability of the curcuminoid caused by the high-temperature and high-pressure sterilization, the 2nd control group without the antioxidant is further provided so as to compared with the 8th embodiment. The curcuminoid of the 2nd control group is represented by Formula (2), and the following condition is satisfied: Ccu=0.05%.

The values of T2831, T3138, T4146, T4678 and T3878 of the 2nd control group and the 8th embodiment on the day before the sterilization (Day −1), the day of the sterilization (Day 0), 10 days after the sterilization (Day 10), and 17 days after the sterilization (Day 17) are shown in Table 7.

TABLE 7

| | 2nd control group Antioxidant | | | | 8th embodiment | | | |
|---|---|---|---|---|---|---|---|---|
| | 0% | | | | Vitamin C 1.00% | | | |
| | Period of sterilization (Day) | | | | | | | |
| | −1 | 0 | 10 | 17 | −1 | 0 | 10 | 17 |
| T2831 | 87.6 | 84.2 | 85.6 | 88.3 | 87.0 | 22.1 | 72.4 | 51.4 |
| T3138 | 84.2 | 90.8 | 91.2 | 92.1 | 83.6 | 73.1 | 76.1 | 60.8 |
| T4146 | 77.7 | 95.1 | 96.4 | 96.8 | 76.6 | 77.5 | 80.3 | 74.0 |
| T4678 | 98.3 | 99.3 | 99.0 | 98.9 | 98.0 | 97.9 | 97.2 | 94.4 |
| T3878 | 94.3 | 98.3 | 98.4 | 98.4 | 93.8 | 93.7 | 93.6 | 89.8 |

Furthermore, the values of BE2831, BE3138, BE4146, BE4678 and BE3878 of the 8th embodiment on the day of the sterilization, 10 days after the sterilization, and 17 days after the sterilization are further calculated. The aforementioned calculation is based on the values of T2831, T3138, T4146, T4678 and T3878 of the 2nd control group and the 8th embodiment. The values of BE2831, BE3138, BE4146, BE4678 and BE3878 of the 2nd control group and the 8th embodiment are shown in Table 8.

TABLE 8

| Period of sterilization | 2nd control group and 8th embodiment | | |
|---|---|---|---|
| (Day) | 0 | 10 | 17 |
| BE2831 | 73.7 | 15.4 | 41.7 |
| BE3138 | 19.5 | 16.6 | 33.9 |
| BE4146 | 18.5 | 16.7 | 23.6 |
| BE4678 | 1.4 | 1.9 | 4.6 |
| BE3878 | 4.7 | 4.9 | 8.8 |

9th Embodiment to 12th Embodiment

In the contact lens products according to the 9th embodiment to the 12th embodiment, the curcuminoid of the contact lens is represented by Formula (3), and the details of the curcuminoid of the 9th embodiment to 12th embodiment are shown in Table 9.

TABLE 9

| Curcuminoid | Curcumin + HEMA*2 |
|---|---|
| Structure | Formula (3) |
| SMILES Notation | COC1=C(OCCOC(=O)C(C)=C)C=CC(\C=C\C(=O)CC(=O)\C=C\C2=CC(OC)=C(OCCOC(=O)C(C)=C)C=C2)=C1 |
| Molecular Formula | $C_{33}H_{36}O_{10}$ |
| Molecular weight Wmc (g/mol, Dalton) | 592 |

In the contact lens products of the 9th embodiment to the 12th embodiment, the antioxidant of the buffer solution is vitamin C, and the wetting agents are hyaluronic acid and sodium alginate. The values of the parameters of Ccu, Cao, Cad and Ccu/Cao of the 9th embodiment to the 12th embodiment are shown in Table 10.

TABLE 10

|  |  | 9th embodiment | 10th embodiment | 11th embodiment | 12th embodiment |
|---|---|---|---|---|---|
| Ccu (%) |  | 0.05 | 0.50 | 0.05 | 0.50 |
| Cao (%) |  | 0.10 | 0.10 | 1.00 | 1.00 |
| Cad | HA | 0.01 | 0.01 | 0.03 | 0.06 |

TABLE 10-continued

|  |  | 9th embodiment | 10th embodiment | 11th embodiment | 12th embodiment |
|---|---|---|---|---|---|
| (%) | SA | 0.01 | 0.01 | 0.05 | 0.06 |
| Ccu/Cao |  | 0.50 | 5.00 | 0.05 | 0.50 |

13th Embodiment to 16th Embodiment

In the contact lens products according to the 13th embodiment to the 16th embodiment, the curcuminoid of the contact lens is represented by Formula (4), and the details of the curcuminoid of the 13 embodiment to the 16th embodiment are shown in Table 11.

TABLE 11

| Curcuminoid | Curcumin + HEMA*2 |
|---|---|
| Structure | Formula (4) |
| SMILES Notation | COC1=C(O)C=CC(\C=C\C(OCCOC(=O)C(C)=C)=CC(=O)\C=C\C2=CC(OC)=C(OCCOC(=O)C(C)=C)C=C2)=C1 |
| Molecular Formula | $C_{33}H_{36}O_{10}$ |
| Molecular weight Wmc (g/mol, Dalton) | 592 |

In the contact lens products of the 13th embodiment to the 16th embodiment, the antioxidant of the buffer solution is vitamin C, and the wetting agents are hyaluronic acid and sodium alginate. The values of the parameters of Ccu, Cao, Cad and Ccu/Cao of the 13th embodiment to 16th embodiment are shown in Table 12.

TABLE 12

|  |  | 13th embodiment | 14th embodiment | 15th embodiment | 16th embodiment |
|---|---|---|---|---|---|
| Ccu (%) |  | 0.05 | 0.50 | 0.05 | 0.50 |
| Cao (%) |  | 0.10 | 0.10 | 1.00 | 1.00 |
| Cad | HA | 0.01 | 0.01 | 0.03 | 0.06 |
| (%) | SA | 0.01 | 0.01 | 0.05 | 0.06 |
| Ccu/Cao |  | 0.50 | 5.00 | 0.05 | 0.50 |

17th Embodiment to 20th Embodiment

In the contact lens products according to the 17th embodiment to the 20th embodiment, the curcuminoid of the contact lens is represented by Formula (5), and the details of the curcuminoid of the 17th embodiment to the 20th embodiment are shown in Table 13.

TABLE 13

| Curcuminoid | Curcumin + HEMA*3 |
|---|---|
| Structure | Formula (5) |
| SMILES Notation | COC1=C(OCCOC(=O)C(C)=C)C=CC(\C=C\<br>C(=O)C=C(OCCOC(=O)C(C)=C)\C=C\<br>C2=CC(OC)=C(OCCOC(=O)C(C)=C)C=C2)=C1 |
| Molecular Formula<br>Molecular weight<br>Wmc<br>(g/mol, Dalton) | $C_{39}H_{44}O_{12}$<br>704 |

In the contact lens products of the 17th embodiment to the 20th embodiment, the antioxidant of the buffer solution is vitamin C, and the wetting agents are hyaluronic acid and sodium alginate. The values of the parameters of Ccu, Cao, Cad and Ccu/Cao of the 17th embodiment to the 20th embodiment are shown in Table 14.

TABLE 14

|  |  | 17th embodiment | 18th embodiment | 19th embodiment | 20th embodiment |
|---|---|---|---|---|---|
| Ccu (%) | | 0.05 | 0.50 | 0.05 | 0.50 |
| Cao (%) | | 0.10 | 0.10 | 1.00 | 1.00 |
| Cad | HA | 0.01 | 0.01 | 0.03 | 0.06 |
| (%) | SA | 0.01 | 0.01 | 0.05 | 0.06 |
| Ccu/Cao | | 0.50 | 5.00 | 0.05 | 0.50 |

21st Embodiment to 24th Embodiment

In the contact lens products according to the 21st embodiment to the 24th embodiment, the curcuminoid of the contact lens is represented by Formula (6), and the details of the curcuminoid of the 21st embodiment to the 24th embodiment are shown in Table 15.

TABLE 15

| Curcuminoid | Curcumin + MAA*1 |
|---|---|
| Structure | Formula (6) |
| SMILES Notation | COC1=C(O)C=CC(\C=C\C(O)=CC(=O)\C=C\<br>C2=CC(OC)=C(OC(=O)C(C)=C)C=C2)=C1 |
| Molecular Formula<br>Molecular weight<br>Wmc<br>(g/mol, Dalton) | $C_{25}H_{24}O_7$<br>436 |

In the contact lens products of the 21st embodiment to the 24th embodiment, the antioxidant of the buffer solution is vitamin C, and the wetting agents are hyaluronic acid and sodium alginate. The values of the parameters of Ccu, Cao, Cad and Ccu/Cao of the 21st embodiment to the 24th embodiment are shown in Table 16.

TABLE 16

|  |  | 21st embodiment | 22nd embodiment | 23rd embodiment | 24th embodiment |
|---|---|---|---|---|---|
| Ccu (%) | | 0.05 | 0.50 | 0.05 | 0.50 |
| Cao (%) | | 0.10 | 0.10 | 1.00 | 1.00 |
| Cad | HA | 0.01 | 0.01 | 0.03 | 0.06 |
| (%) | SA | 0.01 | 0.01 | 0.05 | 0.06 |
| Ccu/Cao | | 0.50 | 5.00 | 0.05 | 0.50 |

25th Embodiment to 28th Embodiment

In the contact lens products according to the 25th embodiment to the 28th embodiment, the curcuminoid of the contact lens is represented by Formula (7), and the details of the curcuminoid of the 25th embodiment to the 28th embodiment are shown in Table 17.

TABLE 17

| Curcuminoid | Curcumin + MAA*1 |
|---|---|
| Structure | (Formula (7)) |
| SMILES Notation | COC1=C(O)C=CC(\C=C\C(=O)C=C(OC(=O)C(C)=C)\C=C\C2=CC(OC)=C(O)C=C2)=C1 |
| Molecular Formula | $C_{25}H_{24}O_7$ |
| Molecular weight Wmc (g/mol, Dalton) | 436 |

In the contact lens products of the 25th embodiment to the 28th embodiment, the antioxidant of the buffer solution is vitamin C, and the wetting agents are hyaluronic acid and sodium alginate. The values of the parameters of Ccu, Cao, Cad and Ccu/Cao of the 25th embodiment to the 28th embodiment are shown in Table 18.

TABLE 18

|  |  | 25th embodiment | 26th embodiment | 27th embodiment | 28th embodiment |
|---|---|---|---|---|---|
| Ccu (%) |  | 0.05 | 0.50 | 0.05 | 0.50 |
| Cao (%) |  | 0.10 | 0.10 | 1.00 | 1.00 |
| Cad | HA | 0.01 | 0.01 | 0.03 | 0.06 |
| (%) | SA | 0.01 | 0.01 | 0.05 | 0.06 |
| Ccu/Cao |  | 0.50 | 5.00 | 0.05 | 0.50 |

29th Embodiment to 32nd Embodiment

In the contact lens products according to the 29th embodiment to the 32nd embodiment, the curcuminoid of the contact lens is represented by Formula (8), and the details of the curcuminoid of the 29th embodiment to the 32nd embodiment are shown in Table 19.

TABLE 19

| Curcuminoid | Curcumin + MAA*2 |
|---|---|
| Structure | (Formula (8)) |
| SMILES Notation | COC1=C(OC(=O)C(C)=C)C=CC(\C=C\C(O)=CC(=O)\C=C\C2=CC(OC)=C(OC(=O)C(C)=C)C=C2)=C1 |
| Molecular Formula | $C_{29}H_{28}O_8$ |
| Molecular weight Wmc (g/mol, Dalton) | 504 |

In the contact lens products of the 29th embodiment to the 32nd embodiment, the antioxidant of the buffer solution is vitamin C, and the wetting agents are hyaluronic acid and sodium alginate. The values of the parameters of Ccu, Cao, Cad and Ccu/Cao of the 29th embodiment to the 32nd embodiment are shown in Table 20.

TABLE 20

|  |  | 29th embodiment | 30th embodiment | 31st embodiment | 32nd embodiment |
|---|---|---|---|---|---|
| Ccu (%) |  | 0.05 | 0.50 | 0.05 | 0.50 |
| Cao (%) |  | 0.10 | 0.10 | 1.00 | 1.00 |
| Cad (%) | HA | 0.01 | 0.01 | 0.03 | 0.06 |
|  | SA | 0.01 | 0.01 | 0.05 | 0.06 |
| Ccu/Cao |  | 0.50 | 5.00 | 0.05 | 0.50 |

33rd Embodiment to 36th Embodiment

In the contact lens products according to the 33rd embodiment to the 36th embodiment, the curcuminoid of the contact lens is represented by Formula (9), and the details of the curcuminoid of the 33rd embodiment to the 36th embodiment are shown in Table 21.

TABLE 21

| Curcuminoid | Curcumin + MAA*2 |
|---|---|
| Structure | Formula (9) |
| SMILES Notation | COC1=C(O)C=CC(\C=C\C(OC(=O)C(C)=C)=CC(=O)\C=C\C2=CC(OC)=C(OC(=O)C(C)=C)C=C2)=C1 |
| Molecular Formula | $C_{29}H_{28}O_8$ |
| Molecular weight Wmc (g/mol, Dalton) | 504 |

In the contact lens products of the 33rd embodiment to the 36th embodiment, the antioxidant of the buffer solution is vitamin C, and the wetting agents are hyaluronic acid and sodium alginate. The values of the parameters of Ccu, Cao, Cad and Ccu/Cao of the 33rd embodiment to the 36th embodiment are shown in Table 22.

TABLE 22

|  |  | 33rd embodiment | 34th embodiment | 35th embodiment | 36th embodiment |
|---|---|---|---|---|---|
| Ccu (%) |  | 0.05 | 0.50 | 0.05 | 0.50 |
| Cao (%) |  | 0.10 | 0.10 | 1.00 | 1.00 |
| Cad (%) | HA | 0.01 | 0.01 | 0.03 | 0.06 |
|  | SA | 0.01 | 0.01 | 0.05 | 0.06 |
| Ccu/Cao |  | 0.50 | 5.00 | 0.05 | 0.50 |

37th Embodiment to 40th Embodiment

In the contact lens products according to the 37th embodiment to the 40th embodiment, the curcuminoid of the contact lens is represented by Formula (10), and the details of the curcuminoid of the 37th embodiment to the 40th embodiment are shown in Table 23.

TABLE 23

| Curcuminoid | Curcumin + MAA*3 |
|---|---|
| Structure | (Formula (10)) |
| SMILES Notation | COC1=C(OC(=O)C(C)=C)C=CC(\C=C\C(=O)C=C(OC(=O)C(C)=C)\C=C\C2=CC(OC)=C(OC(=O)C(C)=C)C=C2)=C1 |
| Molecular Formula | $C_{33}H_{32}O_9$ |
| Molecular weight Wmc (g/mol, Dalton) | 572 |

In the contact lens products of the 37th embodiment to the 40th embodiment, the antioxidant of the buffer solution is vitamin C, and the wetting agents are hyaluronic acid and sodium alginate. The values of the parameters of Ccu, Cao, Cad and Ccu/Cao of the 37th embodiment to the 40th embodiment are shown in Table 24.

TABLE 24

|  |  | 37th embodiment | 38th embodiment | 39th embodiment | 40th embodiment |
|---|---|---|---|---|---|
| Ccu (%) |  | 0.05 | 0.50 | 0.05 | 0.50 |
| Cao (%) |  | 0.10 | 0.10 | 1.00 | 1.00 |
| Cad | HA | 0.01 | 0.01 | 0.03 | 0.06 |

TABLE 24-continued

|  |  | 37th embodiment | 38th embodiment | 39th embodiment | 40th embodiment |
|---|---|---|---|---|---|
| (%) | SA | 0.01 | 0.01 | 0.05 | 0.06 |
| Ccu/Cao |  | 0.50 | 5.00 | 0.05 | 0.50 |

41st Embodiment to 44th Embodiment

In the contact lens products according to the 41st embodiment to the 44th embodiment, the curcuminoid of the contact lens is represented by Formula (11), and the details of the curcuminoid of the 41st embodiment to the 44th embodiment are shown in Table 25.

TABLE 25

| Curcuminoid | Curcumin + GMA*1 |
|---|---|
| Structure | (Formula (11)) |
| SMILES Notation | COC1=C(O)C=CC(\C=C\C(O)=CC(=O)\C=C\C2=CC(OC)=C(OCC(O)COC(=O)C(C)=C)C=C2)=C1 |
| Molecular Formula | $C_{28}H_{30}O_9$ |
| Molecular weight Wmc (g/mol, Dalton) | 510 |

In the contact lens product of the 41st embodiment to the 44th embodiment, the antioxidant of the buffer solution is vitamin C, and the wetting agents are hyaluronic acid and sodium alginate. The values of the parameters of Ccu, Cao, Cad and Ccu/Cao of the 41st embodiment to the 44th embodiment are shown in Table 26.

TABLE 26

|  |  | 41st embodiment | 42nd embodiment | 43rd embodiment | 44th embodiment |
|---|---|---|---|---|---|
| Ccu (%) |  | 0.05 | 0.50 | 0.05 | 0.50 |
| Cao (%) |  | 0.10 | 0.10 | 1.00 | 1.00 |
| Cad | HA | 0.01 | 0.01 | 0.03 | 0.06 |

TABLE 26-continued

|  |  | 41st embodiment | 42nd embodiment | 43rd embodiment | 44th embodiment |
|---|---|---|---|---|---|
| (%) | SA | 0.01 | 0.01 | 0.05 | 0.06 |
| Ccu/Cao |  | 0.50 | 5.00 | 0.05 | 0.50 |

45th Embodiment to 48th Embodiment

In the contact lens products according to the 45th embodiment to the 48th embodiment, the curcuminoid of the contact lens is represented by Formula (12), and the details of the curcuminoid of the 45th embodiment to the 48th embodiment are shown in Table 27.

TABLE 27

| Curcuminoid | Curcumin + GMA*1 |
|---|---|
| Structure | 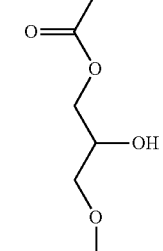<br>Formula (12) |
| SMILES Notation | COC1=C(O)C=CC(\C=C\C(=O)C=C(OCC(O)COC(=O)C(C)=C)\C=C\C2=CC(OC)=C(O)C=C2)=C1 |
| Molecular Formula | $C_{28}H_{30}O_9$ |
| Molecular weight Wmc (g/mol, Dalton) | 510 |

In the contact lens products of the 45th embodiment to the 48th embodiment, the antioxidant of the buffer solution is vitamin C, and the wetting agents are hyaluronic acid and sodium alginate. The values of the parameters of Ccu, Cao, Cad and Ccu/Cao of the 45th embodiment to the 48th embodiment are shown in Table 28.

TABLE 28

|  |  | 45th embodiment | 46th embodiment | 47th embodiment | 48th embodiment |
|---|---|---|---|---|---|
| Ccu (%) |  | 0.05 | 0.50 | 0.05 | 0.50 |
| Cao (%) |  | 0.10 | 0.10 | 1.00 | 1.00 |
| Cad | HA | 0.01 | 0.01 | 0.03 | 0.06 |
| (%) | SA | 0.01 | 0.01 | 0.05 | 0.06 |
| Ccu/Cao |  | 0.50 | 5.00 | 0.05 | 0.50 |

49th Embodiment to 52nd Embodiment

In the contact lens products according to the 49th embodiment to the 52nd embodiment, the curcuminoid of the contact lens is represented by Formula (13), and the details of the curcuminoid of the 49th embodiment to the 52nd embodiment are shown in Table 29.

TABLE 29

| Curcuminoid | Curcumin + GMA*2 |
|---|---|
| Structure | Formula (13) |
| SMILES Notation | COC1=C(OCC(O)COC(=O)C(C)=C)C=CC(\C=C\<br>C(O)=CC(=O)\C=C\C2=CC(OC)=C(OCC(O)COC(=O)C(C)=C)C=C2)=C1 |
| Molecular Formula | $C_{35}H_{40}O_{12}$ |
| Molecular weight Wmc (g/mol, Dalton) | 652 |

In the contact lens products of the 49th embodiment to the 52nd embodiment, the antioxidant of the buffer solution is vitamin C, and the wetting agents are hyaluronic acid and sodium alginate. The values of the parameters of Ccu, Cao, Cad and Ccu/Cao of the 49th embodiment to the 52nd embodiment are shown in Table 30.

TABLE 30

|  |  | 49th embodiment | 50th embodiment | 51st embodiment | 52nd embodiment |
|---|---|---|---|---|---|
| Ccu (%) |  | 0.05 | 0.50 | 0.05 | 0.50 |
| Cao (%) |  | 0.10 | 0.10 | 1.00 | 1.00 |
| Cad | HA | 0.01 | 0.01 | 0.03 | 0.06 |
| (%) | SA | 0.01 | 0.01 | 0.05 | 0.06 |
| Ccu/Cao |  | 0.50 | 5.00 | 0.05 | 0.50 |

53rd Embodiment to 56th Embodiment

In the contact lens products according to the 53rd embodiment to the 56th embodiment, the curcuminoid of the contact lens is represented by Formula (14), and the details of the curcuminoid of the 53rd embodiment to the 56th embodiment are shown in Table 31.

TABLE 31

| Curcuminoid | Curcumin + GMA*2 |
|---|---|
| Structure | Formula (14) |
| SMILES Notation | COC1=C(O)C=CC(\C=C\C(OCC(O)COC(=O)C(C)=C)=CC(=O)\<br>C=C\C2=CC(OC)=C(OCC(O)COC(=O)C(C)=C)C=C2)=C1 |
| Molecular Formula | $C_{35}H_{40}O_{12}$ |
| Molecular weight Wmc (g/mol, Dalton) | 652 |

In the contact lens products of the 53rd embodiment to the 56th embodiment, the antioxidant of the buffer solution is vitamin C, and the wetting agents are hyaluronic acid and sodium alginate. The values of the parameters of Ccu, Cao, Cad and Ccu/Cao of the 53rd embodiment to the 56th embodiment are shown in Table 32.

TABLE 32

|  |  | 53rd embodiment | 54th embodiment | 55th embodiment | 56th embodiment |
|---|---|---|---|---|---|
| Ccu (%) |  | 0.05 | 0.50 | 0.05 | 0.50 |
| Cao (%) |  | 0.10 | 0.10 | 1.00 | 1.00 |
| Cad (%) | HA | 0.01 | 0.01 | 0.03 | 0.06 |
|  | SA | 0.01 | 0.01 | 0.05 | 0.06 |
| Ccu/Cao |  | 0.50 | 5.00 | 0.05 | 0.50 |

57th Embodiment to 60th Embodiment

In the contact lens products according to the 57th embodiment to the 60th embodiment, the curcuminoid of the contact lens is represented by Formula (15), and the details of the curcuminoid of the 57th embodiment to the 60th embodiment are shown in Table 33.

TABLE 33

| Curcuminoid | Curcumin + GMA*3 |
|---|---|
| Structure | Formula (15) |
| SMILES Notation | COC1=C(OCC(O)COC(=O)C(C)=C)C=CC(\C=C\C(=O)C=C(OCC(O)COC(=O)C(C)=C)\C=C\C2=CC(OC)=C(OCC(O)COC(=O)C(C)=C)C=C2)=C1 |
| Molecular Formula | $C_{42}H_{50}O_{15}$ |
| Molecular weight Wmc (g/mol, Dalton) | 794 |

In the contact lens products of the 57th embodiment to the 60th embodiment, the antioxidant of the buffer solution is vitamin C, and the wetting agents are hyaluronic acid and sodium alginate. The values of the parameters of Ccu, Cao, Cad and Ccu/Cao of the 57th embodiment to the 60th embodiment are shown in Table 34.

TABLE 34

|  |  | 57th embodiment | 58th embodiment | 59th embodiment | 60th embodiment |
|---|---|---|---|---|---|
| Ccu (%) |  | 0.05 | 0.50 | 0.05 | 0.50 |
| Cao (%) |  | 0.10 | 0.10 | 1.00 | 1.00 |
| Cad (%) | HA | 0.01 | 0.01 | 0.03 | 0.06 |
|  | SA | 0.01 | 0.01 | 0.05 | 0.06 |
| Ccu/Cao |  | 0.50 | 5.00 | 0.05 | 0.50 |

The foregoing description, for purpose of explanation, has been described with reference to specific embodiments. It is to be noted that Tables show different data of the different embodiments; however, the data of the different embodiments are obtained from experiments. The embodiments were chosen and described in order to best explain the principles of the disclosure and its practical applications, to thereby enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. A contact lens product, comprising:

a contact lens; and a buffer solution, wherein the contact lens is stored in the buffer solution, and the buffer solution comprises at least one antioxidant;

wherein the contact lens comprises a cured monomer mixture comprising at least one curcuminoid;

wherein the at least one curcuminoid is synthesized by reacting unmodified curcumin with a modifying reactant selected from the group consisting of 2-hydroxyethyl methacrylate (HEMA), methacrylic acid (MAA), and glycerol monomethacrylate (GMA), where the reaction involves the hydroxyl group of HEMA, the carboxylic acid group of MMA, or a hydroxyl group of GMA; and wherein the at least one curcuminoid is represented by Formula (I) or Formula (II):

Formula (I)

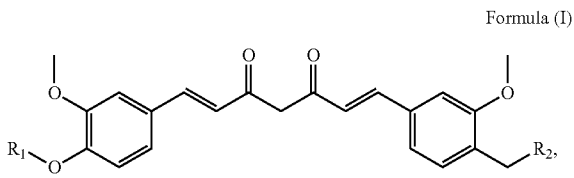

wherein $R_1$ and $R_2$ represent a hydrogen atom or a reacted modifying reactant, and at least one of $R_1$ and $R_2$ represents the reacted modifying reactant; or Formula (II)

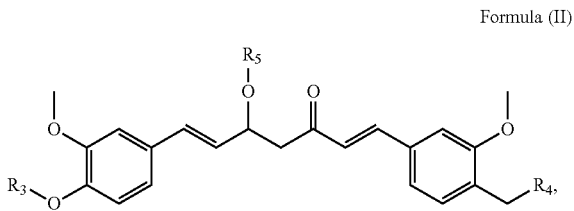

wherein $R_5$ represents a reacted modifying reactant, and $R_3$ and $R_4$ represent a hydrogen atom or a reacted modifying reactant;

wherein a weight percentage concentration of the curcuminoid in the contact lens is Ccu, a weight percentage concentration of the antioxidant in the buffer solution is Cao, and the following conditions is satisfied:

$0.01 \leq Ccu/Cao \leq 10.00$.

2. The contact lens product of claim 1, wherein the modifying reactant is 2-hydroxyethyl methacrylate.

3. The contact lens product of claim 2, wherein the weight percentage concentration of the curcuminoid in the contact lens is Ccu, and the following condition is satisfied:

$0.01\% \leq Ccu \leq 5.00\%$.

4. The contact lens product of claim 3, wherein the weight percentage concentration of the antioxidant in the buffer solution is Cao, and the following conditions is satisfied:

$0.05\% \leq Cao \leq 5.00\%$.

5. The contact lens product of claim 4, wherein the buffer solution further comprises at least one wetting agent, a weight percentage concentration of the wetting agent in the buffer solution is Cad, and the following conditions is satisfied:

$0.001\% \leq Cad \leq 1.00\%$.

6. The contact lens product of claim 5, wherein a molecular weight of the curcuminoid is Wmc, and the following condition is satisfied:

$400 \leq Wmc \leq 800$.

7. The contact lens product of claim 3, wherein the contact lens comprises a cured monomer mixture comprising at least two curcuminoids.

8. The contact lens product of claim 3, wherein the contact lens further comprises at least one pigment.

9. The contact lens product of claim 8, wherein the contact lens comprises at least three lens layers.

10. The contact lens product of claim 9, wherein the at least one pigment forms a pattern.

11. The contact lens product of claim 1, wherein the at least one curcuminoid is represented by Formula (II), and the modifying reactant is methacrylic acid or glycerol monomethacrylate.

12. The contact lens product of claim 1, wherein when at least one day after the contact lens is sterilized, an average transmittance of the contact lens in a wavelength range of 280 nm-310 nm is T2831, and the following condition is satisfied:

$50\% \leq T2831 \leq 90\%$.

13. The contact lens product of claim 12, wherein when at least one day after the contact lens is sterilized, an average transmittance of the contact lens in a wavelength range of 310 nm-380 nm is T3138, and the following condition is satisfied:

$60\% \leq T3138 \leq 92\%$.

14. The contact lens product of claim 13, wherein when at least one day after the contact lens is sterilized, an average transmittance of the contact lens in a wavelength range of 410 nm-460 nm is T4146, and the following condition is satisfied:

$70\% \leq T4146 \leq 90\%$.

15. The contact lens product of claim 1, wherein when at least one day after the contact lens is sterilized, an absorbing blocking effectiveness of the contact lens in a wavelength range of 280 nm-310 nm is BE2831, and the following condition is satisfied:

$4.0\% \leq BE2831 \leq 50.0\%$.

16. The contact lens product of claim 15, wherein when at least one day after the contact lens is sterilized, an absorbing blocking effectiveness of the contact lens in a wavelength range of 310 nm-380 nm is BE3138, and the following condition is satisfied:

$3.0\% \leq BE3138 \leq 35.0\%$.

17. The contact lens product of claim 16, wherein when at least one day after the contact lens is sterilized, an absorbing blocking effectiveness of the contact lens in a wavelength range of 410 nm-460 nm is BE4146, and the following condition is satisfied:

$1.0\% \leq BE4146 \leq 30.0\%$.

18. The contact lens product of claim 1, wherein the contact lens product is a daily disposable product and further comprises:

a light-proof package.

* * * * *